(12) United States Patent
Lawrence et al.

(10) Patent No.: US 11,781,860 B2
(45) Date of Patent: Oct. 10, 2023

(54) MOBILE VEHICULAR ALIGNMENT FOR SENSOR CALIBRATION

(71) Applicant: BPG Sales and Technology Investments, LLC, Ada, MI (US)

(72) Inventors: Jon D. Lawrence, Corvallis, OR (US); David M. DeBoer, Grand Rapids, MI (US); Ryan M. Jefferies, Grand Rapids, MI (US); Nicholas R. Nelson, Grand Rapids, MI (US)

(73) Assignee: BPG SALES AND TECHNOLOGY INVESTMENTS, LLC, Ada, MI (US)

( * ) Notice: Subject to any disclaimer, the term of this patent is extended or adjusted under 35 U.S.C. 154(b) by 353 days.

(21) Appl. No.: 16/728,361

(22) Filed: Dec. 27, 2019

(65) Prior Publication Data

US 2020/0141724 A1     May 7, 2020

Related U.S. Application Data

(63) Continuation-in-part of application No. 16/398,404, filed on Apr. 30, 2019, now Pat. No. 11,624,608.
(Continued)

(51) Int. Cl.
*G01B 11/275*     (2006.01)

(52) U.S. Cl.
CPC ........ *G01B 11/2755* (2013.01); *G01B 11/275* (2013.01); *G01B 2210/12* (2013.01);
(Continued)

(58) Field of Classification Search
CPC ............ G01B 11/2755; G01B 2210/12; G01B 2210/30; G01B 2210/303; G01B 2210/143; G01B 11/275
(Continued)

(56) References Cited

U.S. PATENT DOCUMENTS 3,288,020 A * 11/1966 Lill ...................... G01B 11/275
                                                                33/288
3,630,623 A   12/1971 Schirmer et al.
(Continued)

FOREIGN PATENT DOCUMENTS

CN          1764818 A      4/2006
CN         100373129       3/2008
(Continued)

OTHER PUBLICATIONS

Translation WO-2017016541 (Year: 2017).*
(Continued)

*Primary Examiner* — Peter J Macchiarolo
*Assistant Examiner* — Monica S Young
(74) *Attorney, Agent, or Firm* — Gardner, Linn, Burkhart & Ondersma

(57) ABSTRACT

A mobile system and method of calibrating an ADAS sensor of a vehicle by aligning a target with the sensor, where a transport vehicle is equipped with a target adjustment stand for transporting to the vehicle, which is initially nominally positioned in front of the target adjustment stand that includes a movable target mount configured to support a target, with the target adjustment stand including one or more actuators for adjusting the position of the target mount. A computer system is used to determine an orientation of the vehicle relative to the target adjustment stand, with the position of the target mount being adjusted based on the determined orientation of the vehicle relative to the target adjustment stand. Upon properly orienting the target mount, and the target supported thereon, a calibration routine is performed whereby the sensor is calibrated using the target.

23 Claims, 22 Drawing Sheets

Related U.S. Application Data

(60) Provisional application No. 62/798,268, filed on Jan. 29, 2019, provisional application No. 62/785,404, filed on Dec. 27, 2018, provisional application No. 62/664,323, filed on Apr. 30, 2018.

(52) U.S. Cl.
CPC .... *G01B 2210/143* (2013.01); *G01B 2210/30* (2013.01); *G01B 2210/303* (2013.01)

(58) Field of Classification Search
USPC .............................................. 73/1.75; 33/288
See application file for complete search history.

(56) References Cited

U.S. PATENT DOCUMENTS

| | | |
|---|---|---|
| 3,918,816 A | 11/1975 | Foster et al. |
| 4,249,824 A | 2/1981 | Wiederrich et al. |
| 4,303,338 A | 12/1981 | Morrison et al. |
| 4,337,581 A * | 7/1982 | Eck ...................... G01B 11/275 33/336 |
| 4,416,065 A | 11/1983 | Hunter |
| 4,444,496 A | 4/1984 | Dale, Jr. |
| 4,639,878 A | 1/1987 | Day et al. |
| 4,647,208 A | 3/1987 | Bieman |
| 4,690,557 A | 9/1987 | Wiklund |
| 4,724,480 A | 2/1988 | Hecker et al. |
| 4,726,122 A | 2/1988 | Andersson |
| 4,863,266 A | 9/1989 | Masuko et al. |
| RE33,144 E | 1/1990 | Hunter et al. |
| 4,899,218 A | 2/1990 | Waldecker et al. |
| 4,931,964 A | 6/1990 | Titsworth et al. |
| 5,018,853 A | 5/1991 | Hechel et al. |
| 5,044,746 A | 9/1991 | Henseli |
| 5,048,954 A | 9/1991 | Madey et al. |
| 5,054,918 A | 10/1991 | Downing et al. |
| 5,140,533 A | 8/1992 | Celette |
| 5,177,558 A | 1/1993 | Hill |
| 5,177,563 A | 1/1993 | Everett et al. |
| 5,198,877 A | 3/1993 | Schulz |
| 5,249,364 A | 10/1993 | Bishop |
| 5,259,246 A | 11/1993 | Stuyts |
| 5,268,731 A | 12/1993 | Fuchiwaki et al. |
| 5,274,433 A | 12/1993 | Madey et al. |
| 5,291,264 A | 3/1994 | Longa et al. |
| 5,489,983 A | 2/1996 | McClenahan et al. |
| 5,519,489 A | 5/1996 | McClenahan et al. |
| 5,532,816 A | 7/1996 | Spann et al. |
| 5,559,695 A | 9/1996 | Daily |
| 5,583,797 A | 12/1996 | Fluegge et al. |
| 5,600,893 A | 2/1997 | Phillips |
| 5,675,408 A | 10/1997 | Samuelsson et al. |
| 5,703,796 A | 12/1997 | Moradi et al. |
| 5,724,129 A | 3/1998 | Matteucci |
| 5,724,743 A | 3/1998 | Jackson |
| 5,731,870 A | 3/1998 | Bartko et al. |
| 5,760,938 A | 6/1998 | Hodge |
| 5,781,286 A | 7/1998 | Knestel |
| 5,812,256 A | 9/1998 | Chapin et al. |
| 5,815,257 A | 9/1998 | Haas |
| 5,818,574 A | 10/1998 | Jones et al. |
| 5,870,315 A | 2/1999 | January |
| 5,930,881 A | 8/1999 | Naruse et al. |
| 5,978,077 A | 11/1999 | Koerner et al. |
| 6,078,846 A | 6/2000 | Greer et al. |
| 6,100,923 A | 8/2000 | Sass et al. |
| 6,115,927 A | 9/2000 | Hendrix |
| 6,148,528 A | 11/2000 | Jackson |
| 6,161,419 A | 12/2000 | Langlechner |
| 6,226,879 B1 | 5/2001 | Baird |
| 6,285,959 B1 | 9/2001 | Greer |
| 6,363,619 B1 * | 4/2002 | Schirmer ............. G01M 11/067 33/600 |
| 6,397,164 B1 | 5/2002 | Nobis et al. |
| 6,400,451 B1 | 6/2002 | Fukuda et al. |
| 6,404,486 B1 | 6/2002 | Nobis et al. |
| 6,412,183 B1 | 7/2002 | Uno |
| 6,424,411 B1 | 7/2002 | Rapidel et al. |
| 6,456,372 B1 | 9/2002 | Hudy |
| 6,473,978 B1 | 11/2002 | Maas |
| 6,483,577 B2 | 11/2002 | Stieff |
| 6,522,400 B1 | 2/2003 | Horn |
| 6,532,673 B2 * | 3/2003 | Jahn ..................... G01B 11/275 33/645 |
| 6,542,840 B2 | 4/2003 | Okamoto et al. |
| 6,545,750 B2 | 4/2003 | Roth et al. |
| 6,559,936 B1 | 5/2003 | Colombo et al. |
| 6,640,612 B2 | 11/2003 | Corghi |
| 6,657,711 B1 | 12/2003 | Kitagawa et al. |
| 6,658,749 B2 | 12/2003 | Jackson et al. |
| 6,658,751 B2 | 12/2003 | Jackson et al. |
| 6,690,456 B2 | 2/2004 | Bux et al. |
| 6,691,062 B1 | 2/2004 | Nobis |
| 6,707,557 B2 | 3/2004 | Young, Jr. et al. |
| 6,710,866 B1 | 3/2004 | Adolph |
| 6,714,291 B2 | 3/2004 | Castagnoli et al. |
| 6,731,382 B2 | 5/2004 | Jackson et al. |
| 6,744,497 B2 | 6/2004 | Burns, Jr. |
| 6,748,796 B1 | 6/2004 | Van Den Bossche |
| 6,765,664 B2 | 7/2004 | Groothuis et al. |
| 6,766,229 B2 | 7/2004 | Dry et al. |
| 6,796,035 B2 | 9/2004 | Jahn et al. |
| 6,796,043 B2 | 9/2004 | Jackson et al. |
| 6,802,130 B2 | 10/2004 | Podbielski et al. |
| 6,813,015 B2 * | 11/2004 | Knoedler ............. G01B 11/275 356/155 |
| 6,823,598 B1 | 11/2004 | Loescher |
| 6,823,601 B2 | 11/2004 | Murray |
| 6,829,046 B1 | 12/2004 | Groothuis et al. |
| 6,836,970 B2 | 1/2005 | Hirano |
| 6,839,972 B2 | 1/2005 | Jackson et al. |
| 6,842,238 B2 | 1/2005 | Corghi |
| 6,879,403 B2 | 4/2005 | Freifeld |
| 6,912,477 B2 | 6/2005 | Murray |
| 6,915,228 B2 * | 7/2005 | Uffenkamp ................ G06T 7/80 701/1 |
| 6,931,340 B2 | 8/2005 | Jackson et al. |
| 6,959,253 B2 | 10/2005 | Jackson et al. |
| 6,968,282 B1 | 11/2005 | Jackson et al. |
| 7,062,861 B2 | 6/2006 | O'Mahony et al. |
| 7,065,462 B2 | 6/2006 | Merrill et al. |
| 7,075,635 B2 | 7/2006 | Groothuis et al. |
| 7,121,011 B2 | 10/2006 | Murray et al. |
| 7,230,694 B2 | 6/2007 | Forster et al. |
| 7,265,821 B1 | 9/2007 | Lawrence et al. |
| 7,331,211 B2 | 2/2008 | Harrill |
| 7,337,650 B1 | 3/2008 | Preston et al. |
| 7,352,455 B2 | 4/2008 | Groothuis et al. |
| 7,380,344 B2 | 6/2008 | Dietrich |
| 7,382,913 B2 | 6/2008 | Dorranc et al. |
| 7,424,387 B1 | 9/2008 | Gill et al. |
| 7,501,980 B2 | 3/2009 | Focke et al. |
| 7,535,558 B2 | 5/2009 | Uffenkamp et al. |
| 7,570,352 B2 | 8/2009 | Flannigan et al. |
| 7,778,748 B2 | 8/2010 | Probst et al. |
| 7,779,544 B2 | 8/2010 | Tentrup et al. |
| 7,860,295 B2 | 12/2010 | Donner et al. |
| 7,864,309 B2 | 1/2011 | De Sloovere et al. |
| 7,907,265 B2 | 3/2011 | Tentrup et al. |
| 7,908,751 B2 | 3/2011 | Nobis et al. |
| 7,974,806 B1 | 7/2011 | Burns et al. |
| 8,096,057 B2 * | 1/2012 | Schommer ......... G01B 11/2755 33/286 |
| 8,107,062 B2 | 1/2012 | De Sloovere et al. |
| 8,127,599 B2 | 3/2012 | Schommer et al. |
| 8,131,017 B2 | 3/2012 | Bux et al. |
| 8,135,514 B2 | 3/2012 | Kelly et al. |
| 8,150,144 B2 | 4/2012 | Nobis et al. |
| 8,196,461 B2 | 6/2012 | Abraham et al. |
| 8,244,024 B2 | 8/2012 | Dorrance et al. |
| 8,254,666 B2 | 8/2012 | Uffenkamp et al. |
| 8,274,648 B2 | 9/2012 | Corghi |
| 8,363,979 B2 | 1/2013 | Abraham et al. |

(56) References Cited

U.S. PATENT DOCUMENTS

| | | | |
|---|---|---|---|
| 8,400,624 B2 | 3/2013 | De Sloovere et al. | |
| 8,418,543 B2 | 4/2013 | Tentrup et al. | |
| 8,448,342 B2 | 5/2013 | Nobis et al. | |
| 8,452,552 B2 | 5/2013 | Nobis et al. | |
| 8,457,925 B1 | 6/2013 | Stieff et al. | |
| 8,489,353 B2 | 7/2013 | Raphael | |
| 8,492,701 B2 * | 7/2013 | Nobis | G01S 7/4814 250/222.2 |
| 8,522,609 B2 | 9/2013 | Nobis et al. | |
| 8,538,724 B2 | 9/2013 | Corghi | |
| 8,578,765 B2 | 11/2013 | Nobis et al. | |
| 8,638,452 B2 | 1/2014 | Muhle et al. | |
| 8,650,766 B2 | 2/2014 | Nobis et al. | |
| 8,767,382 B2 | 7/2014 | Mori | |
| 8,836,764 B2 | 9/2014 | Gruetzmann et al. | |
| 8,854,454 B2 | 10/2014 | Abraham et al. | |
| 8,918,302 B2 | 12/2014 | Hukkeri et al. | |
| 9,001,189 B2 | 4/2015 | Nobis et al. | |
| 9,127,937 B2 | 9/2015 | Nobis et al. | |
| 9,134,120 B2 | 9/2015 | Schommer et al. | |
| 9,170,101 B2 | 10/2015 | Stieff | |
| 9,182,477 B2 * | 11/2015 | Jones | G01S 13/931 |
| 9,212,907 B2 | 12/2015 | D'Agostino et al. | |
| 9,279,670 B2 | 3/2016 | Schommer et al. | |
| 9,279,882 B2 | 3/2016 | Hukkeri et al. | |
| 9,377,379 B2 | 6/2016 | Lee | |
| 9,448,138 B2 | 9/2016 | Stieff et al. | |
| 9,539,866 B2 | 1/2017 | Mouchet | |
| 9,545,966 B2 | 1/2017 | Kim | |
| 9,581,524 B2 | 2/2017 | Liu | |
| 9,645,051 B2 | 5/2017 | Jin | |
| 9,658,062 B2 | 5/2017 | Duff et al. | |
| 9,677,974 B2 | 6/2017 | Lee | |
| 9,779,560 B1 | 10/2017 | Dorrance et al. | |
| 9,779,561 B1 | 10/2017 | Dorrance et al. | |
| 9,791,268 B2 | 10/2017 | Buzzi et al. | |
| 10,001,429 B2 | 6/2018 | Krueger et al. | |
| 10,068,389 B1 | 9/2018 | Strege et al. | |
| 10,139,213 B2 | 11/2018 | Herrmann et al. | |
| 10,222,455 B1 | 3/2019 | Stieff et al. | |
| 10,240,916 B1 | 3/2019 | Golab et al. | |
| 10,241,195 B1 | 3/2019 | Stieff et al. | |
| 10,284,777 B2 | 5/2019 | Rogers et al. | |
| 10,298,814 B2 | 5/2019 | Harrell et al. | |
| 10,347,006 B2 | 7/2019 | Kunert et al. | |
| 10,365,095 B2 | 7/2019 | D'Agostino et al. | |
| 10,436,885 B2 | 10/2019 | Wheeler et al. | |
| 10,444,010 B2 | 10/2019 | Strege et al. | |
| 10,475,201 B1 | 11/2019 | Hall et al. | |
| 10,514,323 B2 | 12/2019 | Corghi | |
| 10,567,650 B2 | 2/2020 | Rogers et al. | |
| 10,634,488 B2 | 4/2020 | Stieff et al. | |
| 10,670,392 B2 | 6/2020 | Rogers et al. | |
| 10,684,125 B2 | 6/2020 | D'Agostino et al. | |
| 10,692,241 B2 | 6/2020 | Kunert et al. | |
| 10,692,308 B2 | 6/2020 | Cho et al. | |
| 10,697,766 B1 | 6/2020 | Dorrance et al. | |
| 10,788,400 B2 | 9/2020 | Stieff et al. | |
| 10,848,316 B1 | 11/2020 | Stieff et al. | |
| 10,871,368 B2 | 12/2020 | Krueger | |
| 11,061,120 B2 | 7/2021 | Castorena Martinez et al. | |
| 11,243,074 B2 | 2/2022 | DeBoer et al. | |
| 2002/0020071 A1 | 2/2002 | Jackson et al. | |
| 2002/0099483 A1 * | 7/2002 | Jackson | G01B 5/255 701/36 |
| 2004/0049930 A1 * | 3/2004 | Murray | G01B 11/27 33/288 |
| 2005/0022587 A1 | 2/2005 | Tentrup et al. | |
| 2005/0096807 A1 | 5/2005 | Murray et al. | |
| 2006/0090356 A1 * | 5/2006 | Stieff | G01B 11/2755 33/288 |
| 2006/0274303 A1 | 12/2006 | Jackson et al. | |
| 2006/0279728 A1 | 12/2006 | Dorrance et al. | |
| 2008/0007722 A1 * | 1/2008 | Golab | G01C 11/025 356/139.09 |
| 2008/0148581 A1 | 6/2008 | Boni et al. | |
| 2008/0186514 A1 | 8/2008 | Uffenkamp et al. | |
| 2009/0046279 A1 | 2/2009 | Tentrup et al. | |
| 2010/0060885 A1 | 3/2010 | Nobis et al. | |
| 2010/0238291 A1 * | 9/2010 | Pavlov | G06T 7/73 348/148 |
| 2010/0321674 A1 * | 12/2010 | Corghi | G01B 11/2755 356/139.09 |
| 2011/0077900 A1 * | 3/2011 | Corghi | G01B 11/2755 702/150 |
| 2011/0271749 A1 | 11/2011 | Tentrup et al. | |
| 2012/0092654 A1 | 4/2012 | De Sloovere et al. | |
| 2013/0110314 A1 * | 5/2013 | Stieff | G01B 11/275 701/1 |
| 2013/0188020 A1 | 7/2013 | Seifert et al. | |
| 2013/0325252 A1 * | 12/2013 | Schommer | G01S 7/4972 701/33.1 |
| 2014/0129076 A1 | 5/2014 | Mouchet et al. | |
| 2014/0253908 A1 | 9/2014 | Lee | |
| 2014/0253909 A1 | 9/2014 | McClenahan et al. | |
| 2014/0278226 A1 * | 9/2014 | Stieff | G01B 11/2755 702/150 |
| 2015/0049188 A1 | 2/2015 | Harrell et al. | |
| 2015/0049199 A1 | 2/2015 | Rogers et al. | |
| 2015/0134191 A1 * | 5/2015 | Kim | G01M 17/007 701/29.7 |
| 2016/0334209 A1 | 11/2016 | Linson | |
| 2017/0003141 A1 * | 1/2017 | Voeller | G01C 25/00 |
| 2017/0097229 A1 * | 4/2017 | Rogers | G06T 7/0004 |
| 2017/0345159 A1 | 11/2017 | Aoyagi et al. | |
| 2018/0052223 A1 | 2/2018 | Steiff et al. | |
| 2018/0060036 A1 | 3/2018 | Frisch et al. | |
| 2018/0075675 A1 | 3/2018 | Kim | |
| 2018/0094922 A1 | 4/2018 | Oki et al. | |
| 2018/0100783 A1 * | 4/2018 | Stieff | H04N 9/315 |
| 2018/0134529 A1 | 5/2018 | Zecher et al. | |
| 2018/0188022 A1 * | 7/2018 | Leikert | G01B 11/2755 |
| 2018/0259424 A1 | 9/2018 | Tentrup | |
| 2018/0276910 A1 | 9/2018 | Pitt et al. | |
| 2018/0299533 A1 | 10/2018 | Pliefke et al. | |
| 2019/0204184 A1 | 7/2019 | Neumann et al. | |
| 2019/0222723 A1 | 7/2019 | Harrell et al. | |
| 2019/0249985 A1 * | 8/2019 | Stieff | G01B 11/2755 |
| 2019/0279395 A1 | 9/2019 | Kunert et al. | |
| 2019/0331482 A1 | 10/2019 | Lawrence et al. | |
| 2020/0074675 A1 | 3/2020 | Cejka et al. | |
| 2020/0088515 A1 | 3/2020 | Rogers et al. | |
| 2020/0117210 A1 | 4/2020 | Ren et al. | |
| 2020/0130188 A1 | 4/2020 | Awrence et al. | |
| 2020/0273206 A1 | 8/2020 | Corghi | |
| 2020/0309517 A1 | 10/2020 | D'Agostino et al. | |
| 2020/0320739 A1 | 10/2020 | Kunert et al. | |
| 2021/0387637 A1 | 12/2021 | Rogers et al. | |
| 2022/0018935 A1 | 1/2022 | Jefferies et al. | |
| 2022/0234596 A1 | 7/2022 | Jefferies et al. | |

FOREIGN PATENT DOCUMENTS

| | | |
|---|---|---|
| CN | 107856649 A | 3/2018 |
| CN | 207976113 U | 10/2018 |
| DE | 2948573 | 6/1981 |
| DE | 19857871 C1 | 10/2000 |
| DE | 102009009046 A1 | 10/2009 |
| DE | 102009015207 | 9/2010 |
| DE | 102018001865 A1 | 9/2018 |
| EP | 0593066 | 4/1994 |
| EP | 0593067 | 4/1994 |
| EP | 0679865 A1 | 11/1995 |
| EP | 0766064 A2 | 4/1997 |
| EP | 0994329 | 4/2000 |
| EP | 2808082 | 10/2001 |
| EP | 1221584 | 7/2002 |
| EP | 1260832 A1 | 11/2002 |
| EP | 1505363 | 2/2005 |
| EP | 0946857 B1 | 7/2005 |
| EP | 0943890 B1 | 2/2007 |

(56) References Cited

FOREIGN PATENT DOCUMENTS

| | | |
|---|---|---|
| EP | 1376051 B1 | 1/2008 |
| EP | 1295087 B1 | 8/2010 |
| EP | 2302318 | 3/2011 |
| EP | 1818748 B1 | 5/2014 |
| EP | 3084348 B1 | 3/2017 |
| EP | 3036516 B1 | 4/2018 |
| EP | 3608687 A1 | 2/2020 |
| EP | 3228976 B1 | 11/2020 |
| JP | 200505389 A | 3/2005 |
| JP | 4530604 B2 | 8/2010 |
| JP | 2019529918 A | 10/2019 |
| KR | 1020070016095 A | 2/2007 |
| KR | 20100017607 A | 2/2010 |
| KR | 100948886 B1 | 3/2010 |
| KR | 101510336 B1 | 4/2015 |
| KR | 1020150105766 A | 9/2015 |
| KR | 20160137313 A | 11/2016 |
| KR | 101729619 B1 | 4/2017 |
| KR | 20190019403 A | 2/2019 |
| WO | 9515479 A1 | 6/1995 |
| WO | 2000071972 | 11/2000 |
| WO | 0231437 A1 | 4/2002 |
| WO | 2008014783 | 2/2008 |
| WO | 2008086773 A1 | 7/2008 |
| WO | 2008130385 A1 | 10/2008 |
| WO | 2010138543 | 12/2010 |
| WO | 2013079395 A1 | 6/2013 |
| WO | 2015092594 | 6/2015 |
| WO | WO-2017016541 A1 * | 2/2017 ............ B60R 11/04 |
| WO | 2018035040 A1 | 2/2018 |
| WO | 2018067354 A1 | 4/2018 |
| WO | 2018153723 A1 | 8/2018 |
| WO | 2018158073 A1 | 9/2018 |
| WO | 2018167809 A1 | 9/2018 |
| WO | 2018188931 A1 | 10/2018 |
| WO | 2020056303 A1 | 3/2020 |
| WO | 2021005578 | 1/2021 |

OTHER PUBLICATIONS

International Search Report and Written Opinion of the International Searching Authority from corresponding Patent Cooperation Treaty (PCT) Application No. PCT/IB2019/061411, indicated completed on Apr. 23, 2020.
Screenshots from https://www.youtube.com/watch?v=7wdgc-RsewQ, uploaded on Jul. 31, 2015 by Dürr.
ISRA Vision Systems Press Release, No. 97, May 16, 2006 "Mounting Wheels Automatically on Moving Car Bodies".
Dürr Factory Assembly Systems (FAS) materials, Dr. Thomas Tentrup, believed to be dated Sep. 2006, with partial translation of pp. 12-14.
Mahle Aftermarket Italy S.P.A., TechPRO Digital ADAS, 4 pages, Apr. 2019, Parma, Italy.

* cited by examiner

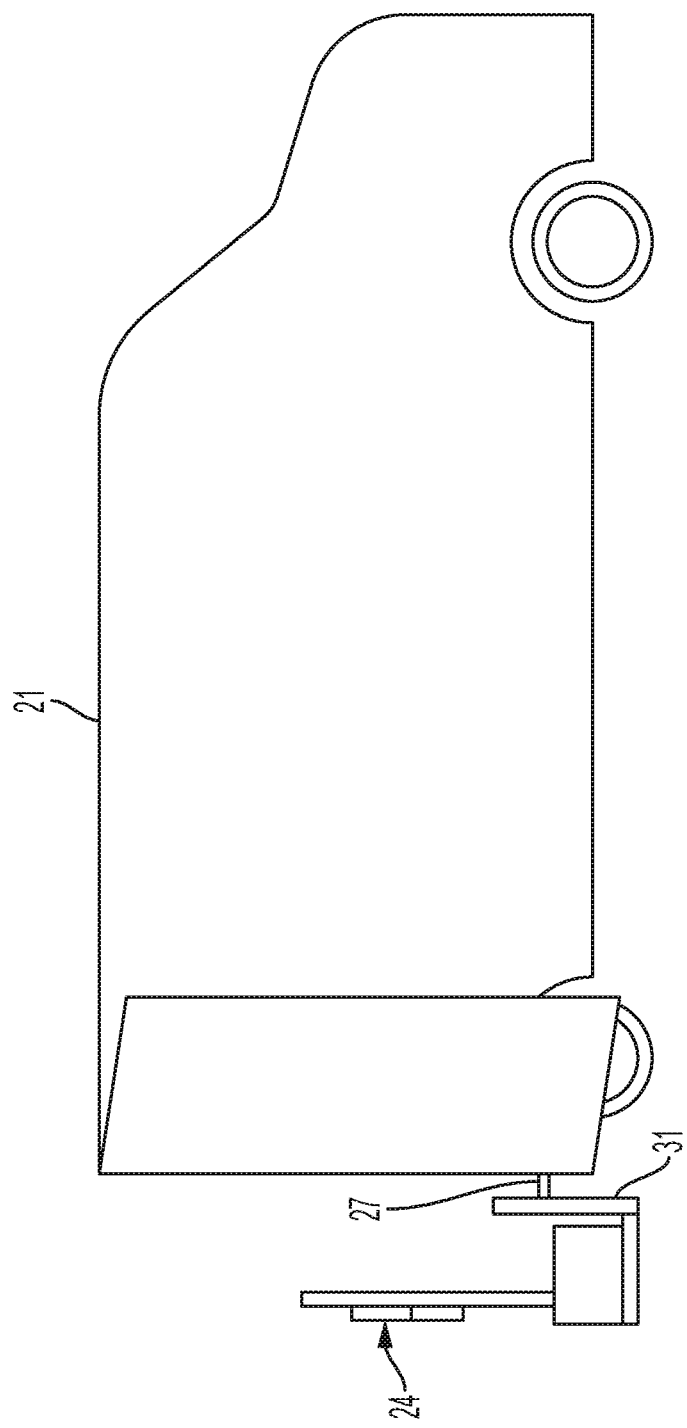

MOBILE VEHICULAR ALIGNMENT FOR SENSOR CALIBRATION

CROSS REFERENCE TO RELATED APPLICATION

The present application claims priority of U.S. provisional application Ser. No. 62/785,404 filed Dec. 27, 2018, and is a continuation-in-part of U.S. application Ser. No. 16/398,404 filed Apr. 30, 2019, which claims priority of U.S. provisional application Ser. No. 62/664,323 filed Apr. 30, 2018, and claims priority of U.S. provisional application Ser. No. 62/798,268 filed Jan. 29, 2019, all of which are hereby incorporated herein by reference in their entireties.

BACKGROUND AND FIELD OF THE INVENTION

The present invention is directed to a vehicle alignment/calibration method and system, and in particular to a method and system for aligning mobile calibration targets mounted to a first vehicle relative to a second vehicle for alignment of the sensors of the second vehicle when in the field away from a traditional service facility for calibration of the sensors of the second vehicle.

The use of radar, imaging systems, and other sensors, such as LIDAR, ultrasonic, and infrared (IR) sensors, to determine range, velocity, and angle (elevation or azimuth) of objects in an environment are important in a number of automotive safety systems, such as an Advanced Driver Assistance System (ADAS) for a vehicle. A conventional ADAS system will utilize one or more sensors. While these sensors are aligned and/or calibrated by the manufacturer during production of the vehicle whereby they are able to provide accurate driver assistance functionality, the sensors may need realignment or recalibration periodically, such as due to the effects of wear and tear, or misalignment due to driving conditions or through mishap, such as a collision.

SUMMARY OF THE INVENTION

The present invention provides a mobile method and system using a transport vehicle for calibrating and/or aligning a vehicle-equipped sensor by aligning the vehicle and thereby the vehicle equipped sensor with one or more calibration targets. The transport vehicle is equipped with a target positioning system that is positioned adjacent a sensor equipped vehicle for aligning the vehicle-equipped sensor(s) to the one or more calibration targets. As discussed herein, once a vertical center plane of the equipped vehicle is determined, a lateral center point of a target may be appropriately aligned with the vehicle's ADAS sensors with respect to the vertical center plane. In particular, a controller issues control signals for controlling the driven motion of a mounted target such that the target panel is aligned to the vehicle's ADAS sensors.

According to an aspect of the present invention, a mobile system and method of calibrating a sensor of an equipped vehicle by aligning a target with the sensor includes initially positioning a transport vehicle carrying a target adjustment stand adjacent the equipped vehicle and nominally positioning the equipped vehicle in front of the target adjustment stand, where the target adjustment stand includes a base and a target mount configured to support a target with the target adjustment stand including one or more actuators for adjusting the position of the target mount. An orientation of the vehicle relative to the target adjustment stand is then determined, with the target mount, and thereby the target, being positioned relative to a sensor of the vehicle based on the determined orientation of the vehicle relative to the target adjustment stand, including such as based on a known location of the sensor on the vehicle. Upon positioning the target relative to the sensor a calibration routine is performed whereby the sensor is calibrated using the target.

In a particular embodiment, the target adjustment stand is movably mounted to the transport vehicle and is moveable from a transport position to a deployed position, such as from an interior bay of the transport vehicle. The target adjustment stand includes a base member movably mounted to the base and a tower joined to the base member, and with the target mount supported by the tower. The target adjustment stand further includes a base member actuator configured to selectively move the base member relative to the base and tower actuators configured to selectively move the tower relative to the base member. A computer system is operable to selectively actuate the base member actuator and tower actuators to position the target relative to an equipped vehicle positioned in front of the target adjustment stand, and in particular relative to a sensor of the vehicle. The computer system is configured to determine the orientation of the equipped vehicle relative to the target adjustment stand and to actuate the base member actuator and tower actuators responsive to the determination of the orientation of the equipped vehicle relative to the target adjustment stand.

Still further, the system may utilize two rearward wheel clamps and two forward wheel clamps, wherein the rearward wheel clamps each include a light projector and are configured for mounting to the opposed wheel assemblies of the vehicle furthest from the target adjustment stand, with the forward wheel clamps each including an aperture and being configured for mounting to the opposed wheel assemblies of the vehicle closest to the target adjustment stand. The light projectors are operable to selectively project light at respective ones of the apertures through which the projected light is directed at the target adjustment stand. The target adjustment stand further includes a pair of imagers with each imager operable to image projected light passing through respective ones of the apertures, with the computing system being operable to determine the orientation of the vehicle relative to the target adjustment stand based on the images of projected light obtained by the imagers.

According to a particular aspect of the invention, a pair of spaced-apart imager panels are provided on the target adjustment stand, where the projected light passing through the apertures is projected onto respective ones of the imager panels to form a light pattern on the imager panel, with the imagers configured to image the light patterns. The imager panels may be translucent with the light patterns formed on a front surface of the panels with the imagers arranged to image the light pattern from a back surface of the imager panels.

A pair of the wheel clamps may each further include a distance sensor configured to obtain distance information of the pair of wheel clamps relative to spaced apart portions of the target adjustment stand, such as the imager panels, with the computer system determining the orientation of the vehicle relative to the target adjustment stand based at least in part on the distance information from the distance sensors.

The computer system may comprise a controller disposed at or locally to the target adjustment stand, with the controller configured to selectively actuate actuators of the target adjustment stand. The computer system may further comprise a remote computing device that is configured to determine the orientation of the vehicle relative to the target adjustment stand and transmit control signals to the controller for selectively actuating the actuators, such as via an Internet connection.

The computer system, such as the remote computing device, may interface with one or more databases for performing the alignment of the target relative to the sensor of the vehicle, as well as performing the calibration routine. The databases may include information regarding makes and models of vehicles, as well as databases regarding specifics of the ADAS sensors equipped on such vehicles and processes for calibrating the sensors, including for example locations of the sensors on the vehicle, specifics regarding the type of target to use for calibrating the sensor, and calibration program routines for calibrating the sensor. The databases may further include calibration routines, such as OEM calibration routines. The computer system may further include a computing device, such as an operator computing device, that interfaces with ECUs of the vehicle to obtain information from the vehicle and/or perform a calibration routine.

According to still a further aspect of the present invention, a mobile system for aligning a target to an equipped vehicle for calibration of a sensor on the equipped vehicle includes a transport vehicle with a target adjustment stand moveably mounted to the transport vehicle, wherein the transport vehicle is configured to transport the target adjustment stand to the equipped vehicle for calibration of a sensor on the equipped vehicle, with the target adjustment stand being moveable between a deployed position and a transport position, and with the target adjustment stand being positioned adjacent the equipped vehicle in the deployed position and stowed for transport in the transport position. The target adjustment stand includes a base and a target mount moveably mounted on the base with the target mount configured to support a target. The target adjustment stand further includes a plurality of actuators configured to selectively move the target mount relative to the base. Wheel clamps are affixable to wheels of the equipped vehicle, including two rearward wheel clamps and two forward wheel clamps, where the rearward wheel clamps each include a light projector and are configured for mounting to the opposed wheel assemblies of the equipped vehicle furthest from the target adjustment stand, and where the forward wheel clamps each include an aperture and are configured for mounting to the opposed wheel assemblies of the equipped vehicle closest to the target adjustment stand. The light projectors are configured to selectively project light at respective apertures through which the projected light is directed at the target adjustment stand. The target adjustment stand further comprises a pair of imagers with each imager operable to image projected light passing through respective ones of the apertures. The system also include a computer system configured to selectively actuate the actuators to position the target relative to the equipped vehicle when the equipped vehicle is positioned in front of the target adjustment stand, with the computer system being configured to determine the orientation of the equipped vehicle relative to the target adjustment stand based on images of projected light obtained by the imagers and to actuate the actuators responsive to the determination of the orientation of the equipped vehicle relative to the target adjustment stand to position the target relative to a sensor of the equipped vehicle whereby the sensor is able to be calibrated using the target.

The present invention provides a mobile system and method for accurately positioning a calibration target relative to a sensor of a vehicle and calibrating the sensor, such as in accordance with OEM specifications. The transportability of the target positioning system using the transport vehicle enables convenient repair of sensor equipped vehicles, and the accurate positioning and calibration of the sensor thus aids in optimizing the performance of the sensor to in turn enable the sensor to perform its ADAS functions. These and other objects, advantages, purposes and features of this invention will become apparent upon review of the following specification in conjunction with the drawings.

BRIEF DESCRIPTION OF THE DRAWINGS

FIG. 1A is side view of the transport vehicle mounted vehicle target alignment system of FIG. 1 with a target positioning system or assembly shown deployed from the transport vehicle as in FIG. 1;

DESCRIPTION OF THE PREFERRED EMBODIMENTS

The present invention will now be described with reference to the accompanying figures, wherein the numbered elements in the following written description correspond to like-numbered elements in the figures.

Figure 1:
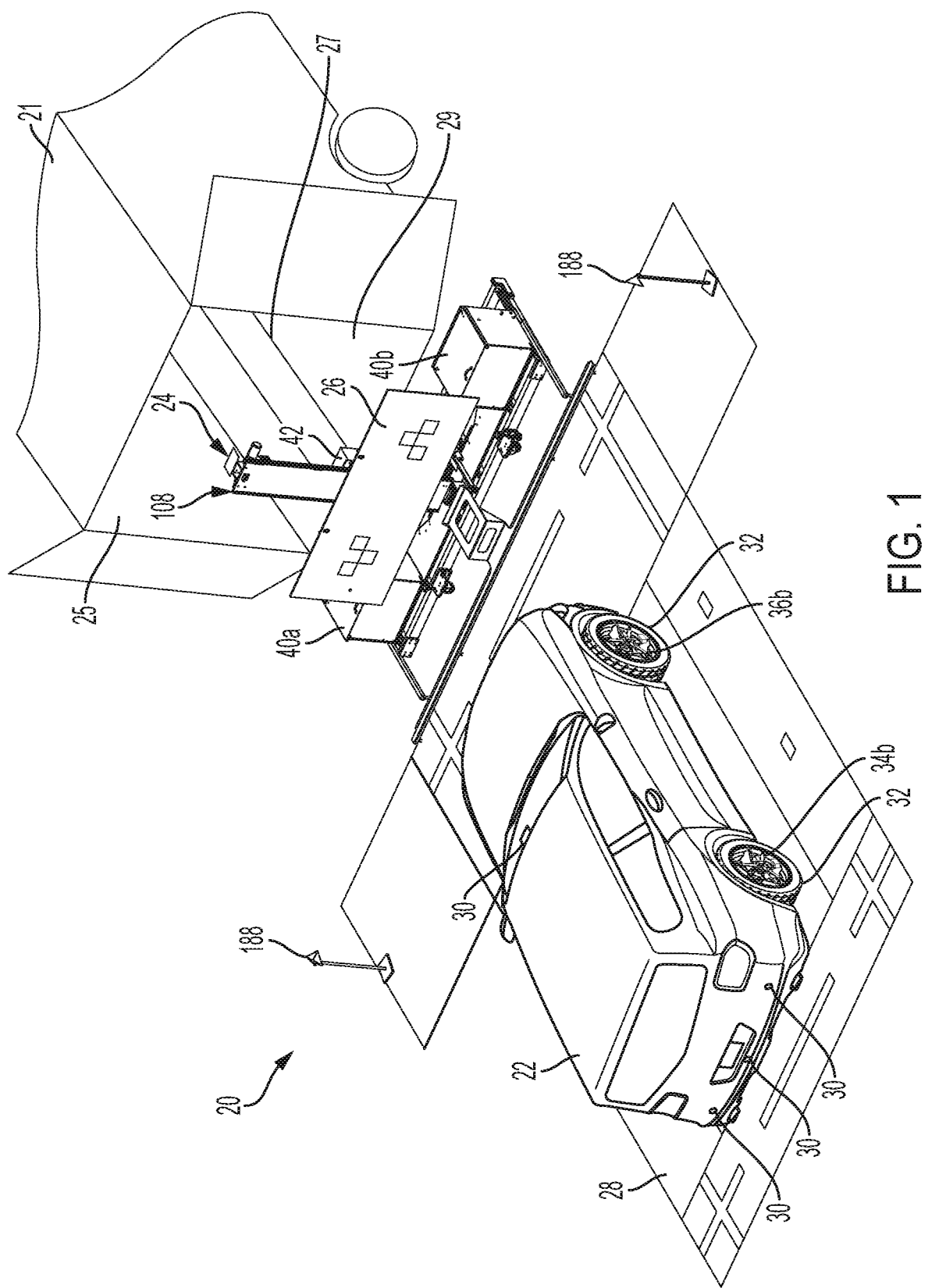
FIG. 1 is a perspective view of a transport vehicle mounted vehicle target alignment system in accordance with the present invention shown in use with an adjacently positioned vehicle.

FIG. 1 illustrates an exemplary mobile vehicle target alignment and sensor calibration system 20 in accordance with the present invention. In general, system 20 includes a transport vehicle 21 that can be driven to a remote location at which a vehicle 22 is located away from a repair facility, where transport vehicle 21 includes a target positioning system 24 that is used to align one or more targets relative to vehicle 22, and in particular to align targets relative to one or more ADAS sensors 30 of the vehicle 22. Upon transport vehicle 21 and vehicle 22 being nominally positioned with respect to each other, target positioning system 24 in the illustrated embodiment of FIG. 1 is deployed from transport vehicle 21, where target positioning system 24 comprises a target adjustment frame or stand. System 20 is then configured to align one or more targets, such as a target or target panel 26 mounted to target adjustment stand 24, or targets on ground mat 28, or other targets, relative to vehicle 22, and in particular to align targets relative to one or more ADAS sensors 30 of the vehicle 22. Sensors 30 may thus be radar sensors for adaptive cruise control ("ACC"), imaging systems such as camera sensors for lane departure warning ("LDW") and other ADAS camera sensors disposed about vehicle, as well as other sensors, such as LIDAR, ultrasonic, and infrared ("IW") sensors of an ADAS system, including sensors mounted inside the vehicle, such as forward facing cameras, or exterior mounted sensors, with the targets supported on stand 24 constructed for calibration of such sensors, including grids, patterns, trihedrals, and the like. Upon aligning the target with the sensor of the vehicle, a calibration routine is performed whereby the sensor is calibrated or aligned using the target.

In the illustrated embodiment, transport vehicle 21 is configured as a van, panel truck or the like having an enclosed storage area or bay 25 within which target adjustment stand 24 is stored for deployment. Transport vehicle 21 may be driven to the location where vehicle 22 is parked, such as at a parking lot, parking garage, parking spot, driveway or other ground surface, whereby a mechanic, service technician, or operator may perform maintenance on vehicle 22. For example, vehicle 22 may have obtained a cracked windshield, with transport vehicle 21 being used to bring a replacement windshield to vehicle 22, whereby a service technician could replace the windshield. In the case of a forward facing windshield mounted ADAS camera, the mobile vehicle target alignment and sensor calibration system 20 may then be used to calibrate the ADAS camera based on the newly installed windshield. It should be appreciated that transport vehicle 21 may be used in connection with the remote repair and calibration of other vehicle components and sensors, including exterior side view mirrors and sensors mounted therein, bumper or fascia mounted sensors, and the like.

Figure 1B:
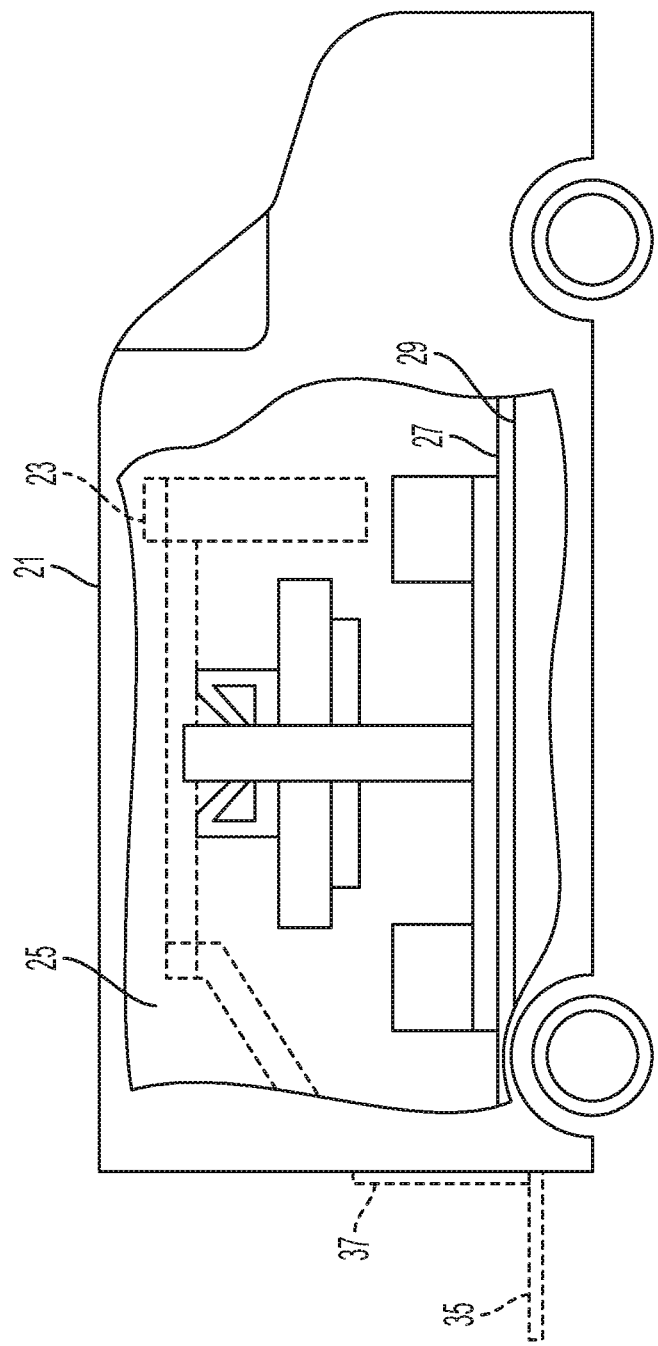
FIG. 1B is a partial cutaway side view of the transport vehicle of FIG. 1 with the target positioning system shown retracted into the transport vehicle in a transport position.

As understood from the illustrated embodiment of FIGS. 1, 1A and 1B, transport vehicle 21 includes a rail 27 affixed to the floor 29 of bay 25, with target adjustment stand 24 being slidably mounted on rail 27 for aiding in deploying target adjustment stand 24 from the transport position within bay 25 shown in FIG. 1B, to the deployed position of FIGS. 1 and 1A. As also understood from FIG. 1B, target adjustment stand 24 is oriented sideways when in the transport position bay 25, whereby target adjustment stand 24 is additionally rotatable on rail 27 when extended from bay 25. As understood from FIGS. 5 and 6, a lift 31, such as an electric or hydraulic cylinder, is provided to raise and lower target adjustment stand 24 relative to the floor 29 of bay 25. In particular, upon extending and rotating target adjustment stand 24 from bay 25, target adjustment stand 24 is then lowered via lift 31 to be in position for use in calibrating sensors of vehicle 22. To this end, target adjustment frame includes a distance sensor 33 used to control the vertical height of target adjustment stand 24 relative to the ground surface upon which transport vehicle 21 and vehicle 22 are located, where distance sensor 33 may be configured as a laser distance sensor, time-of-flight ("ToF") sensor, or other such distance sensor.

In the illustrated embodiment, for example, distance sensor 33 may provide distance data to a computer of system 20, such as controller 42 discussed below, with the computer in turn controlling lift 31 so as to position target adjustment stand 24 in a desired vertical orientation relative to the ground surface upon which transport vehicle 21 and vehicle 22 are positioned. This may be a distance independent of the vehicle 22 to be repaired, or may be a predetermined distance based on the particular make and model of vehicle 22. Alternatively, target adjustment stand 24 may be lowered to a fixed orientation with other actuators of target adjustment stand 24, discussed below, being used to control the orientation of target 26 relative to vehicle 22, and in particular controlling the vertical orientation of target 26.

It should be appreciated that target positioning system 24 may be alternatively retained and/or mounted within transport vehicle 21, and/or alternatively deployed from transport vehicle 21. For example, as shown in FIG. 1B, transport vehicle may be equipped with a lift gate 35 that is vertically moveable via actuators 37, such as either hydraulic or electric actuators, where target positioning system 24 is moved out onto gate 35 and gate 35 is lowered for deployment and raised for returning target positioning system 24 into bay 25. Lift gate 35 itself may be rotatable into a vertical orientation when target positioning system 24 is in a transport orientation, or may be slidable under floor 29 when not in use. In still a further alternative embodiment, target positioning system 24 may be mounted to transport vehicle 21 by a moveable multi-axis arm 23 (FIG. 1B) that at one end is affixed to transport vehicle 21 and at the other holds target positioning system 24. Such a moveable multi-axis arm 23 may be used to both deploy target positioning system 24 via extension of the arm and retract system 24 via retraction of the arm.

As discussed in detail below, in order to align the targets relative to the vehicle sensors 30, in one embodiment wheel clamps are mounted to the wheel assemblies 32 of vehicle 22, where the wheel clamps include a pair of rearward clamps or light projector clamps 34a, 34b and a pair of forward clamps or aperture plate clamps 36a, 36b. Light projected from projector clamps 34a, 34b passes through respective aperture plate clamps 36a, 36b and is received by an imager or camera 38 (FIG. 7) within housings 40a, 40b located on target adjustment stand 24. As discussed in more detail below, a computer system, such as a controller 42 that may be configured as a programmable logic controller (PLC) of system 20, is then configured to adjust the target relative to sensors 30 upon acquisition of data related to the orientation of vehicle 22, including based on the projected light from projector clamps 34a, 34b received by imagers 38. Upon the targets being aligned with a sensor of the vehicle 22, calibration of the sensor may be performed, such as in accordance with OEM specifications. In a particular embodiment the computer system includes a remote computing device that interfaces with controller 42, such as over an internet connection, for both providing an operator of system 20 with instructions as well as for processing and controlling movement of target adjustment stand 24. The following discussion provides details regarding the construction and operation of the illustrated embodiment of vehicle target alignment system 20. As used herein, references to calibration of the sensor encompass alignment of the sensor.

Light projector clamps 34a, 34b and aperture plate clamps 36a, 36b will be discussed with initial reference to FIGS. 2-4. As there shown, a left side projector clamp 34a is mounted to the rear wheel assembly 32 of vehicle 22 and a left side aperture plate clamp 36a is mounted to the front wheel assembly 32. Although not shown in detail, it should be appreciated that the right side clamps 34b, 36b are substantially similar to the left side clamps 34a, 36a, but in mirror arrangement. Due to their similarity not all of the details of the right side clamps are discussed herein. Moreover, the left and right side are referenced with respect to the target adjustment stand 24 relative to the orientation in which the light is projected at stand 24 by the projector clamps 34a, 34b. As discussed below with reference to FIGS. 10-12, vehicle 22 may be alternatively oriented with regard to system 20 for calibration of other vehicle sensors whereby clamps 34, 36 would be mounted to different wheel assemblies. That is, projector clamp 34a would be mounted to the passenger side front wheel assembly 32 and projector clamp 34b would be mounted to the driver side front wheel assembly 32.

In the illustrated embodiment the clamps 34a, 36a are modified from a conventional wheel clamp. The clamps 34a, 36a, include multiple adjustable arms 44 having extendable and retractable projection arms 46 to which are mounted claws 47, where claws 47 are configured for engaging to the wheel flange 48 of the wheel 54 of the wheel assembly 32. Also provided are optional retention arms 50 that engage with the tire of the wheel assembly 32. In use, claws 47 may be disposed about the wheel flange 48 with a spacing of approximately 120 degrees, with projection arms 46 being drawn in, such as by the rotatable handle 52 shown, to securely fix the clamp to the wheel flange 48 of the wheel 54 of the wheel assembly 32. When so mounted, clamps 34a, 36a are co-planar with a plane defined by the wheel 54 and are centered on wheel 54, where wheel 54 is mounted to the hub of the vehicle, which establishes the axis of rotation such that the clamps 34a, 36a are mounted about the axis of rotation of wheel 54. The clamps 34a, 36a further include a central hub 56, which when mounted to wheel 54 is centered on the wheel 54 and is aligned about the axis of rotation of wheel 54.

Figure 2:
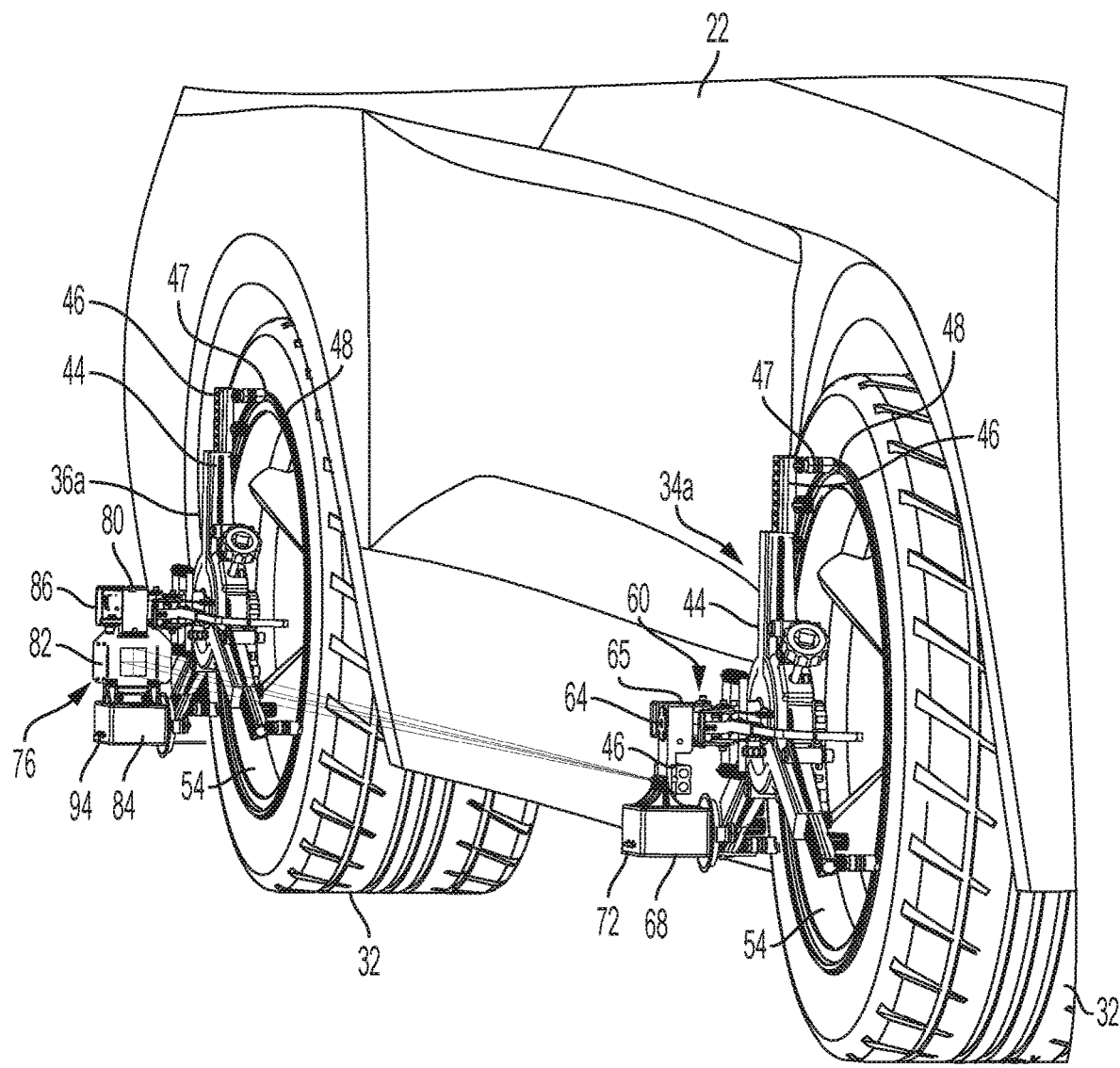
FIG. 2 is a side perspective view of the vehicle of FIG. 1 to which wheel mounted alignment tools in accordance with the present invention are affixed.
Figure 3:
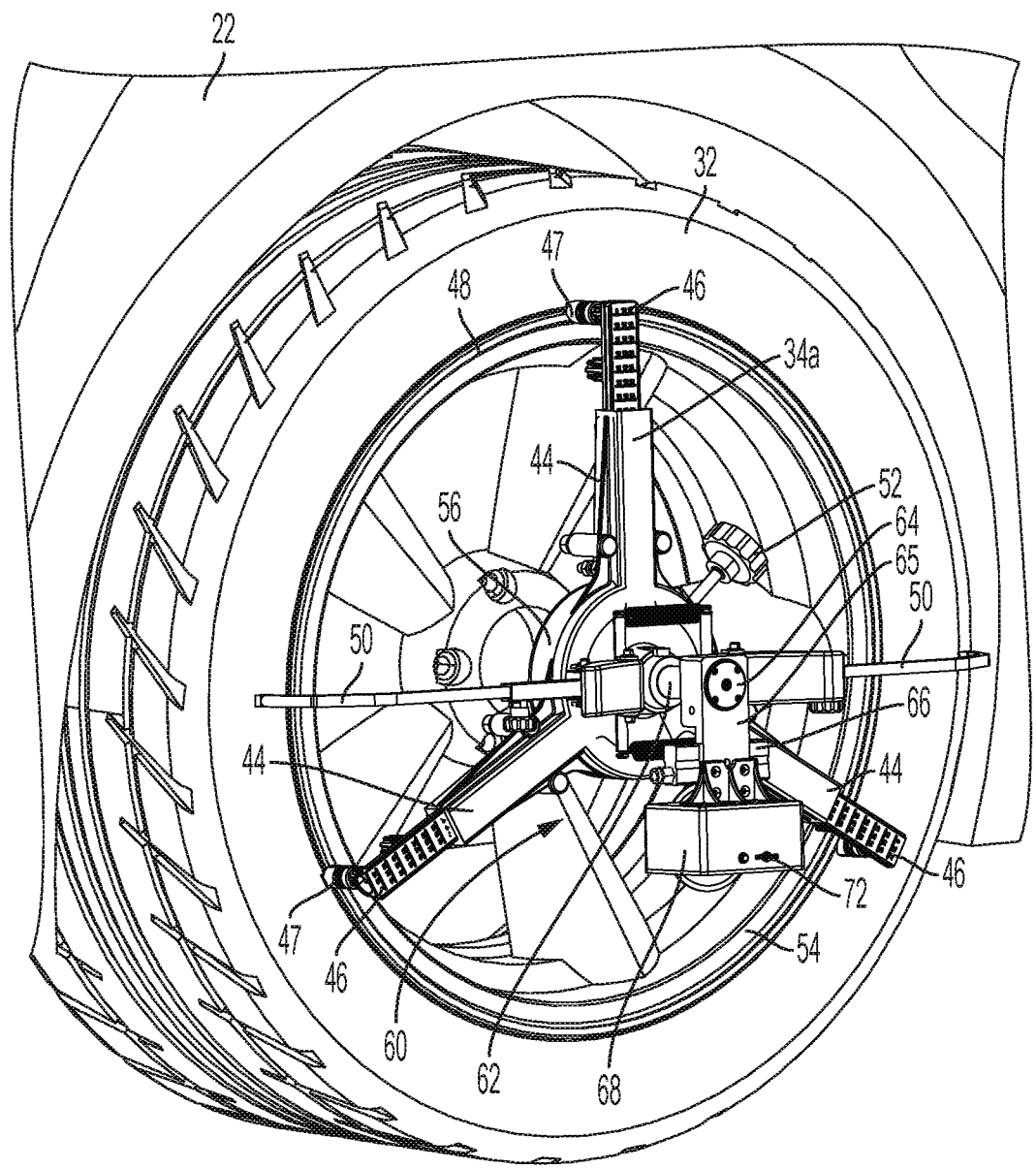
FIG. 3 is a perspective view of the wheel mounted laser tool clamp of FIG. 2.

The projector clamps 34, with reference to the projector clamp 34a shown in FIGS. 2 and 3, are modified to include a projection assembly 60. Projection assembly 60 includes a post or shaft 62, a bearing assembly or mount 64 mounted coaxially to shaft 62, a bearing block 65 connected with bearing mount 64 so as to be disposed perpendicularly to shaft 62 and be able to rotate on shaft 62 via gravity, a light projector that in the illustrated embodiment is configured as a laser 66 attached to bearing block 65, and a projector controller assembly 68 that is also attached to bearing block 65. Shaft 62 is inserted into a hub 56 to thereby extend normal to a plane defined by wheel 54. Bearing mount 64 in turn pivots on shaft 62 such that due to gravity it will naturally rotate into a vertical orientation.

Figure 3A:
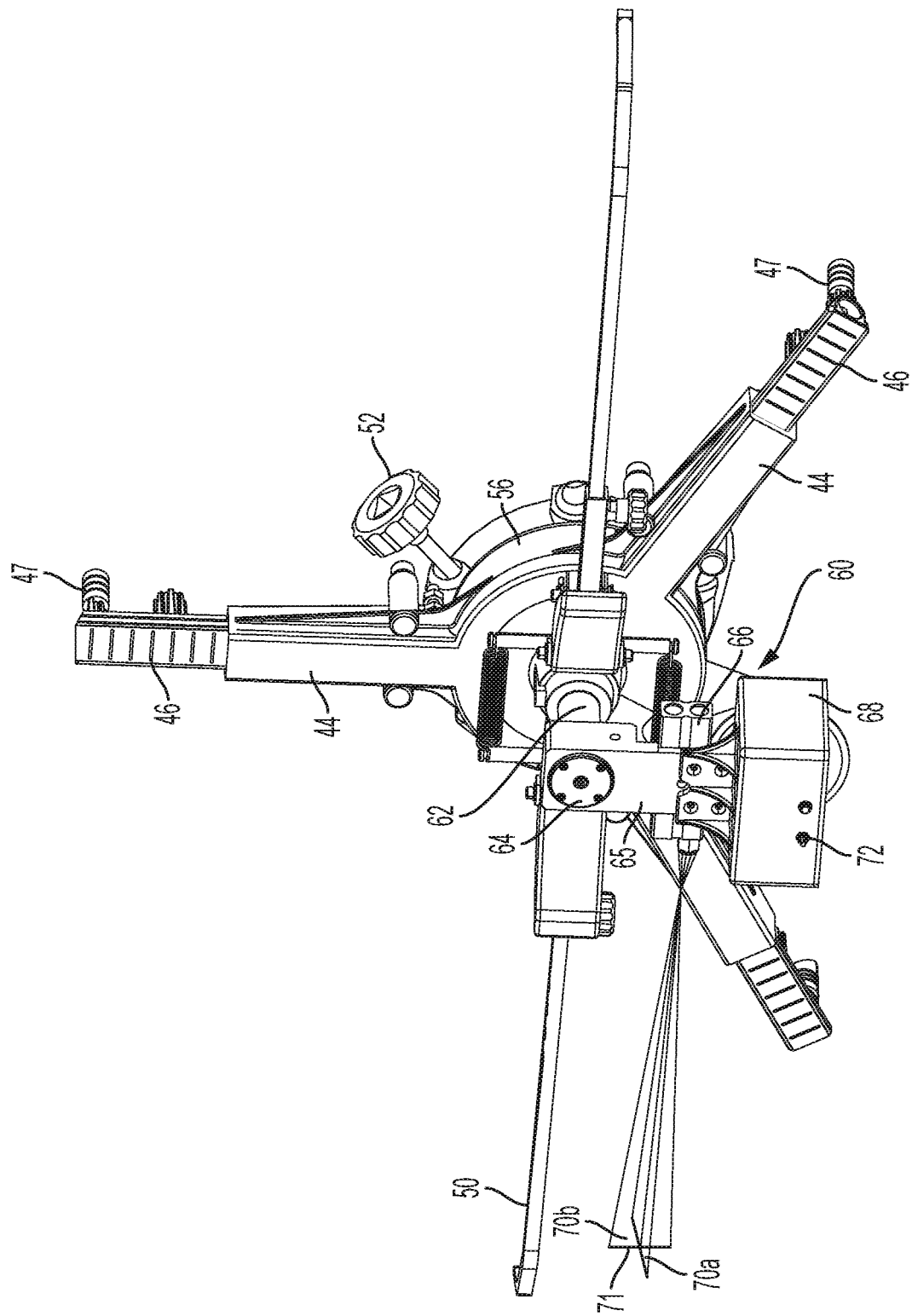
FIG. 3A is a close-up perspective view of the wheel clamp of FIG. 3 shown removed from the wheel assembly.
Figure 4:
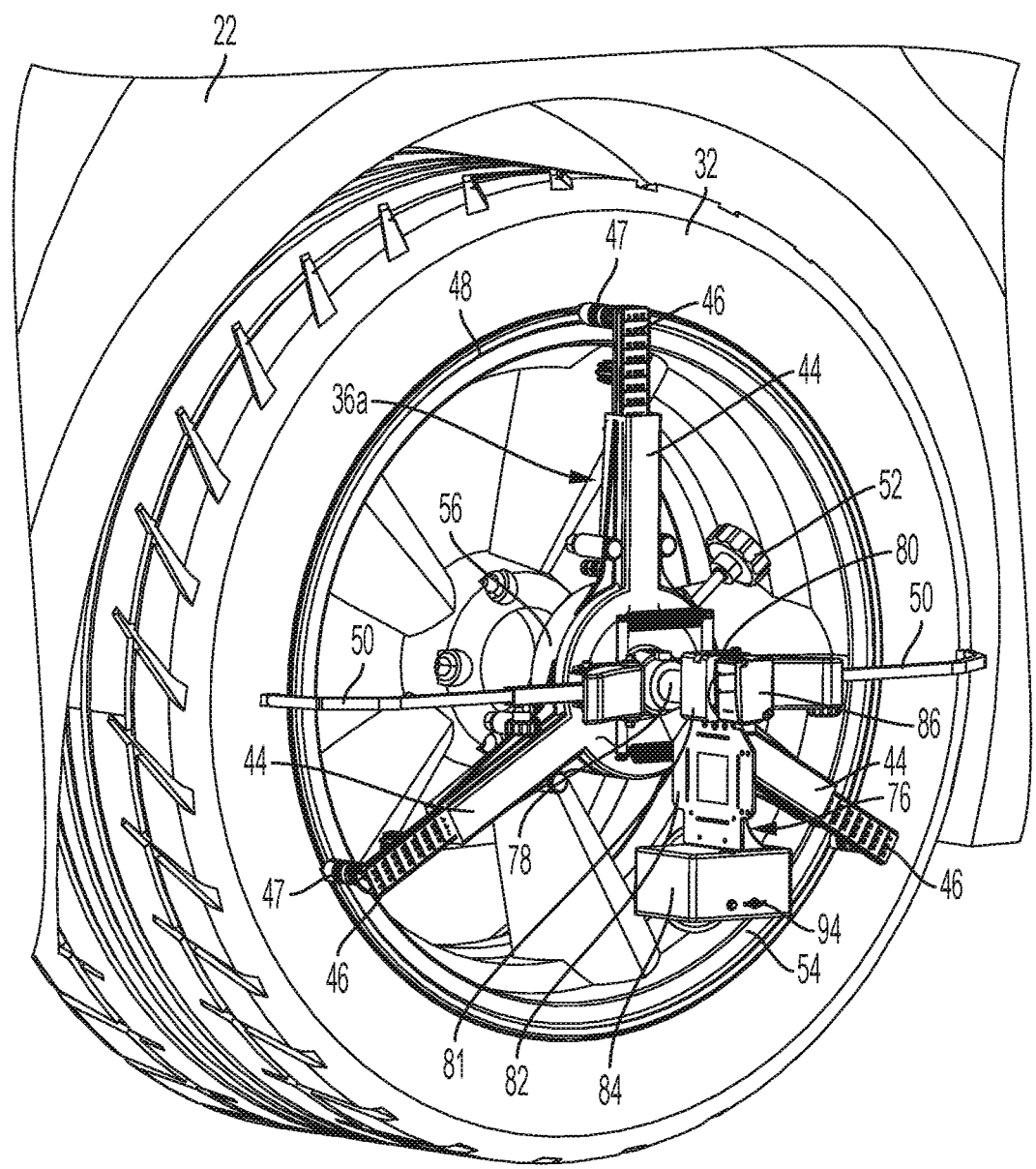
FIG. 4 is a perspective view of the wheel mounted aperture plate tool clamp of FIG. 2.

As understood from FIGS. 2-4, laser 66 is configured to project a pair of light planes 70a, 70b (see FIGS. 3A, 7 and 8) that are oriented perpendicularly to each other in a cross pattern 71. In a situation in which shaft 62 is parallel to the surface upon which vehicle 22 rests, light plane 70a would be planar to the surface upon which vehicle 22 rests and light plane 70b would be perpendicular to the surface.

Projector controller assembly 68 includes a controller, such as a microprocessor, and software for selective operation of laser 66, as well as includes an internal battery and a transmitter/receiver for wireless communication with controller 42, such as by way of a Wi-Fi, Bluetooth, or other wireless communication format, which are contained within a housing, as shown in FIG. 3. As also shown in FIG. 3, assembly 68 may be provided with a control switch 72 for selectively powering the projector assembly 60 on and off.

The aperture plate clamps 36, with reference to the aperture plate clamp 36a shown in FIGS. 2 and 4, are modified to include an aperture assembly 76. Aperture assembly 76 includes a post or shaft 78, a bearing assembly or mount 80 mounted coaxially to shaft 78, a bearing block 81 connected with bearing mount 80 so as to be disposed perpendicularly to shaft 78 and be able to rotate on shaft 78 via gravity, an aperture plate 82 mounted to bearing block 81, a controller assembly 84 mounted to bearing block 81, and a distance sensor 86. Shaft 78 is inserted into a hub 56 to thereby extend normal to a plane defined by wheel 54. Bearing mount 80 in turn pivots on shaft 78 such that due to gravity it will naturally rotate into a vertical orientation.

Figure 4A:
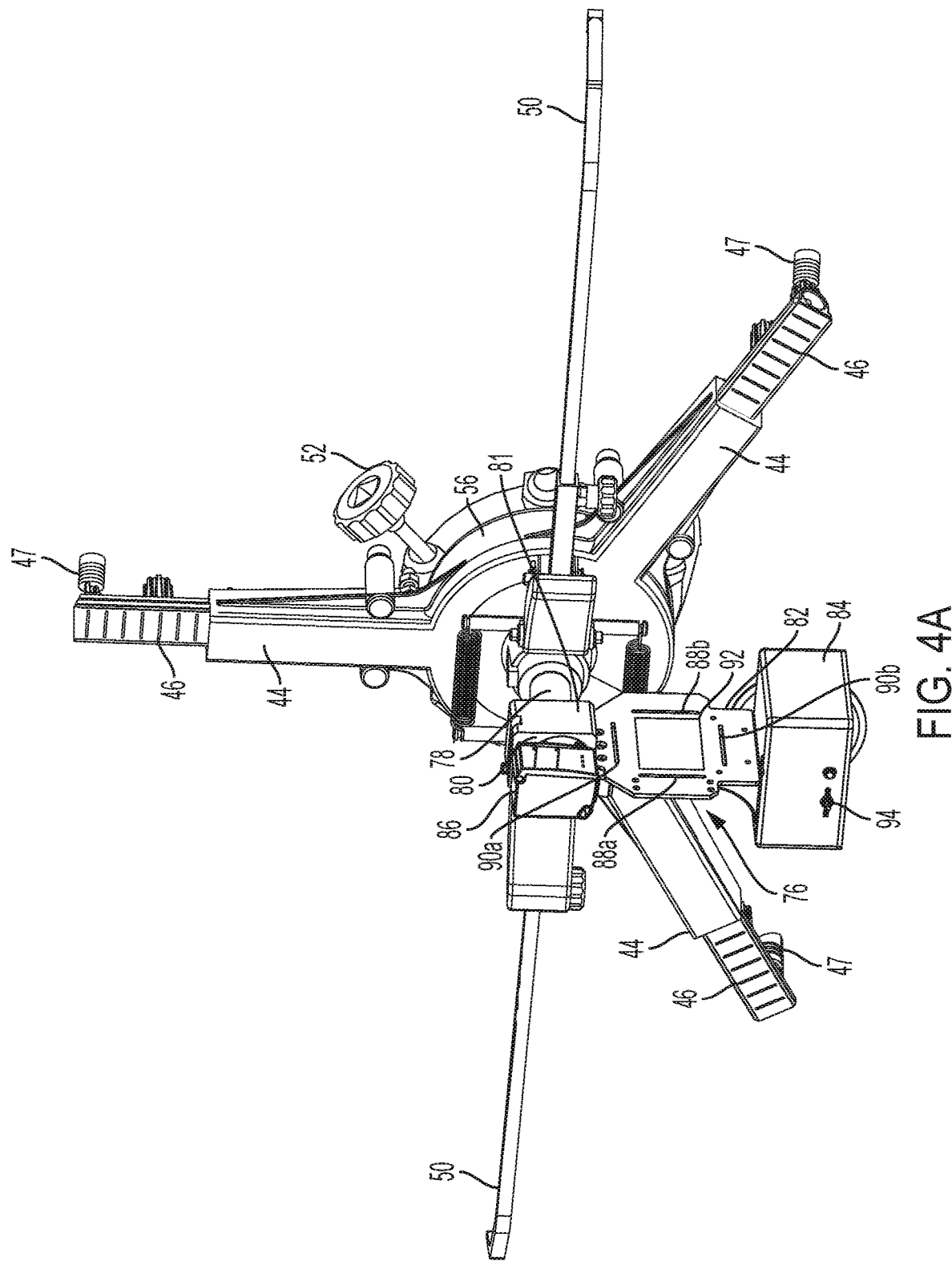
FIG. 4A is a close-up perspective view of the wheel clamp of FIG. 4 shown removed from the wheel assembly.

Aperture plate 82 is configured to include pairs of parallel opposed apertures. In the illustrated embodiment these include a pair of vertically oriented elongate apertures 88a, 88b and a pair of horizontally oriented elongate apertures 90a, 90b (see FIG. 4A), where the pairs of elongate apertures are oriented perpendicularly with respect to each other and are disposed about a central aperture 92 that in the illustrated embodiment is square. In a situation in which shaft 78 was parallel to the surface upon which vehicle 22 rests, apertures 90a, 90b would be aligned parallel to the surface and apertures 88a, 88b would be aligned perpendicular to the surface.

In the illustrated embodiment distance sensors 86 are configured as time-of-flight ("ToF") sensors that are used to determine distances to features of the target adjustment stand 24, as discussed in more detail below. Controller assembly 84 includes a controller, such as a microprocessor, and software for selective operation of sensor 86, as well as includes an internal battery and a transmitter/receiver for wireless communication with controller 42, such as by way of a Wi-Fi, Bluetooth, or other wireless communication format, which are contained within a housing, as shown in FIG. 4. As also shown in FIG. 4, assembly 84 may be provided with a control switch 94 for selectively powering the aperture assembly 76 on and off. Although distance sensors 86 are disclosed as ToF sensors, it should be appreciated that alternative distance sensors may be employed, such as laser distance sensors, or other conventional distance sensors. Moreover, although distance sensors 86 are shown in the illustrated embodiment as being part of aperture plate clamps 36a, 36b, in an alternative arrangement distance sensors 86 may be disposed on projector clamps 34a, 34b. In such an alternative arrangement, the controls of controller assembly 84 may be incorporated with controller assembly 68 whereby no electronics are required on aperture plate claims 36a, 36b.

Figure 5:
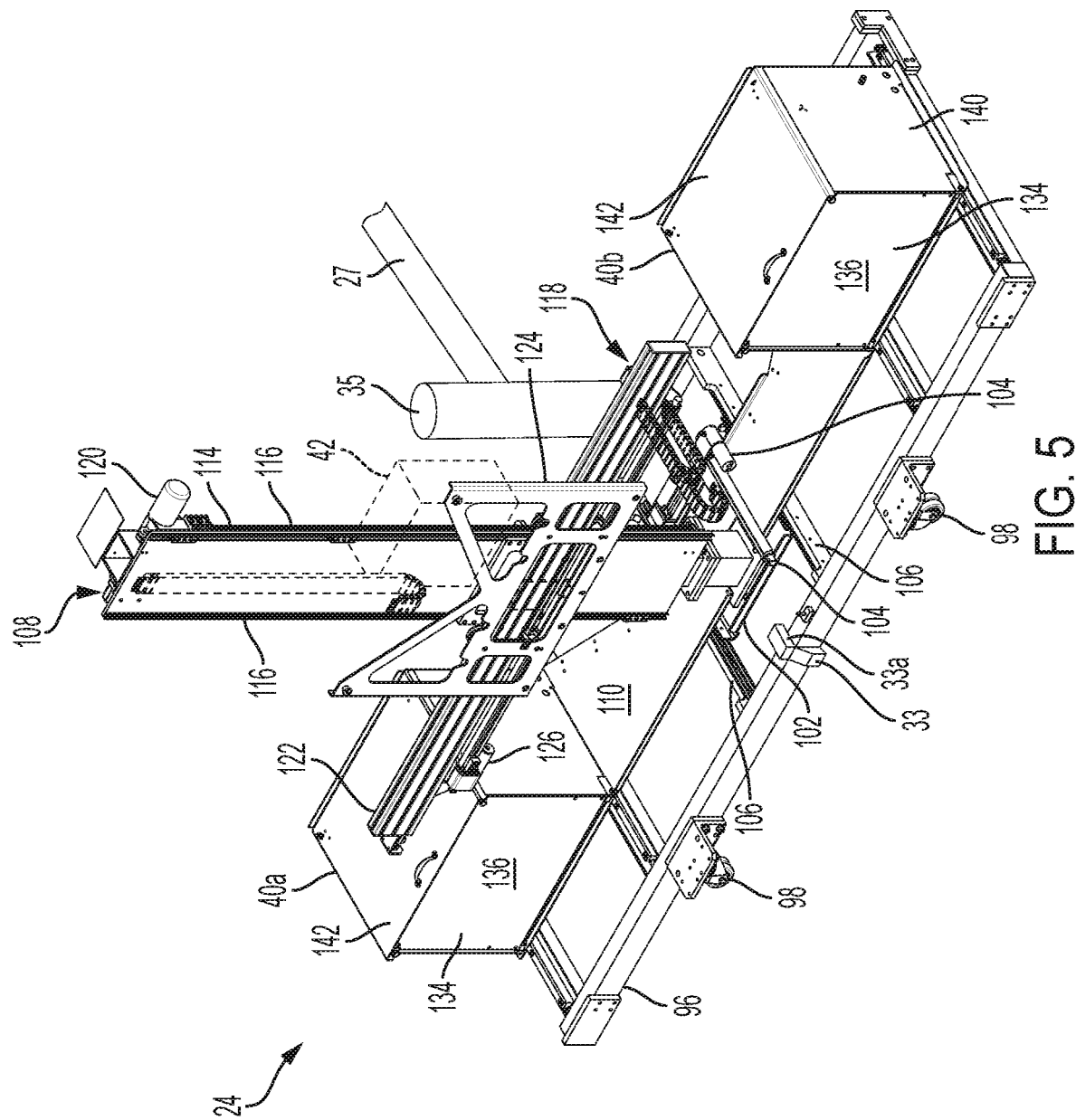
FIG. 5 is a front perspective view of the target positioning system of FIG. 1 shown apart from the transport vehicle and configured as a target adjustment frame or stand.
Figure 6:
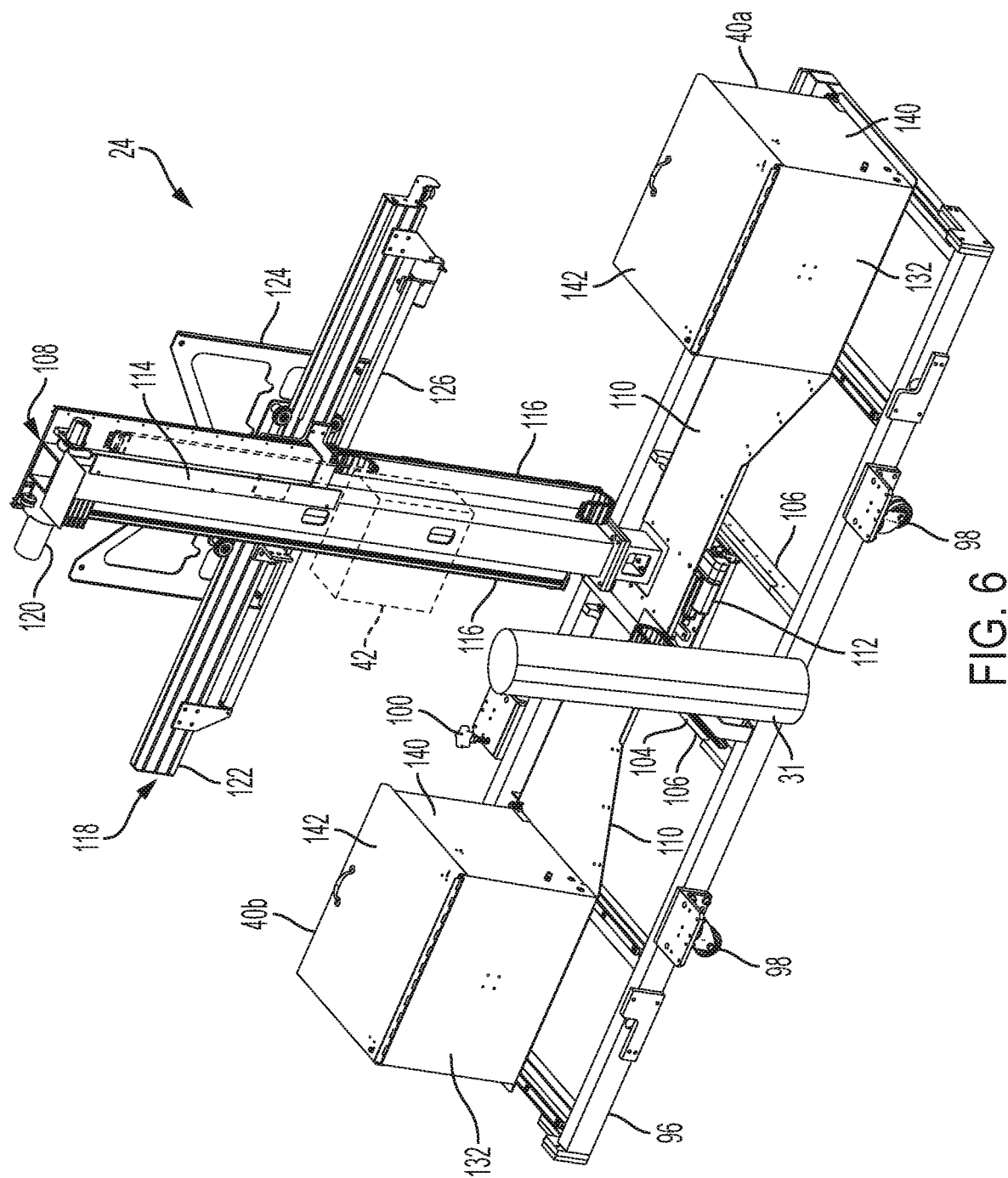
FIG. 6 is a rear perspective view of the target adjustment frame or stand of FIG. 1 shown apart from the transport vehicle.

Referring now to FIGS. 5 and 6, as previously noted target adjustment stand 24 movably supports target 26 and includes alignment housings 40a, 40b and controller 42. Target adjustment stand 24 includes a base or base frame 96, which in the illustrated embodiment is generally rectangular with various cross members. Base 96 may include wheels 98 for traversing floor 29 of transport vehicle 21 to aid in the movement of stand 24 into and out of bay 25.

Target adjustment frame or stand 24 further includes a base member 102 that is moveable forwards and backwards via an actuator 104 along an X-axis, where base member 102 is mounted for sliding movement in rails 106 of base frame 96 and the X-axis is thus parallel to rails 106 for movement longitudinally relative to vehicle 22 when in the orientation of FIG. 1. A tower assembly 108 and an imager housing support 110 are rotatably mounted to base member 102 via a bearing (not shown), with imager housings 40a, 40b being supported distally from one another on opposed ends of support 110. The pivoting or rotatable mounting on base member 102 enable tower assembly 108 and imager housing support 110 to be simultaneously rotated about the vertical or Z-axis by way of actuator 112, as well as translated or moved longitudinally by actuator 104 via movement of base member 102. Due to imager housings 40a, 40b being mounted to support 110, rotation of support 110 via actuator 112 will in turn cause housings 40a, 40b to rotate about the vertical axis. Moreover, in the illustrated embodiment the imager housings 40a, 40b are located equidistant from the rotational Z-axis.

Tower assembly 108 in turn includes an upright frame member configured as a vertically oriented tower 114 with vertically oriented rails 116, with a target support assembly 118 being mounted to rails 116 whereby the assembly 118 is moveable up and down in the vertical or Z-axis, where assembly 118 is moveable by way of actuator 120. Target support assembly 118 is mounted to rails 116 for vertical movement, with a target mount 124 in turn being mounted to horizontal rail 122. Target mount 124 is configured to hold target 26 and is horizontally moveable along rail 122 by way of actuator 126.

System 20 may additionally include holders for retaining the pairs of projector clamps 34 and aperture plate clamps 36 for respective sides of a vehicle when the clamps 34, 36 are not in use. In particular, the holders may be configured as battery charging stations for recharging the batteries of clamps 34, 36, such as between uses, where such holders may be mounted within bay 25 of transport vehicle 21.

Actuators 104, 112, 120 and 126 are operably connected, such as by control wires, with controller 42 whereby controller 42 is able to selectively activate the actuators to move their associated components of target adjustment frame 24. It should be appreciated that various constructions or types of actuators may be used for actuators 104, 112, 120 and 126 for movement of the various components of target adjustment frame 24. In the illustrated embodiment, actuators 104, 112, 120 and 126 are constructed as electrical linear actuators. Alternatively, however, the actuators may be constructed as geared tracks, adjustment screws, hydraulic or pneumatic piston actuators, or the like. Still further, it should be appreciated that alternative arrangements of target adjustment frame and actuators may be employed for positioning of a target within the scope of the present invention. For example, base member 102 may be configured for lateral movement relative to base frame 96 and/or tower 108 may be configured for lateral movement relative to base member 102.

Figure 7:
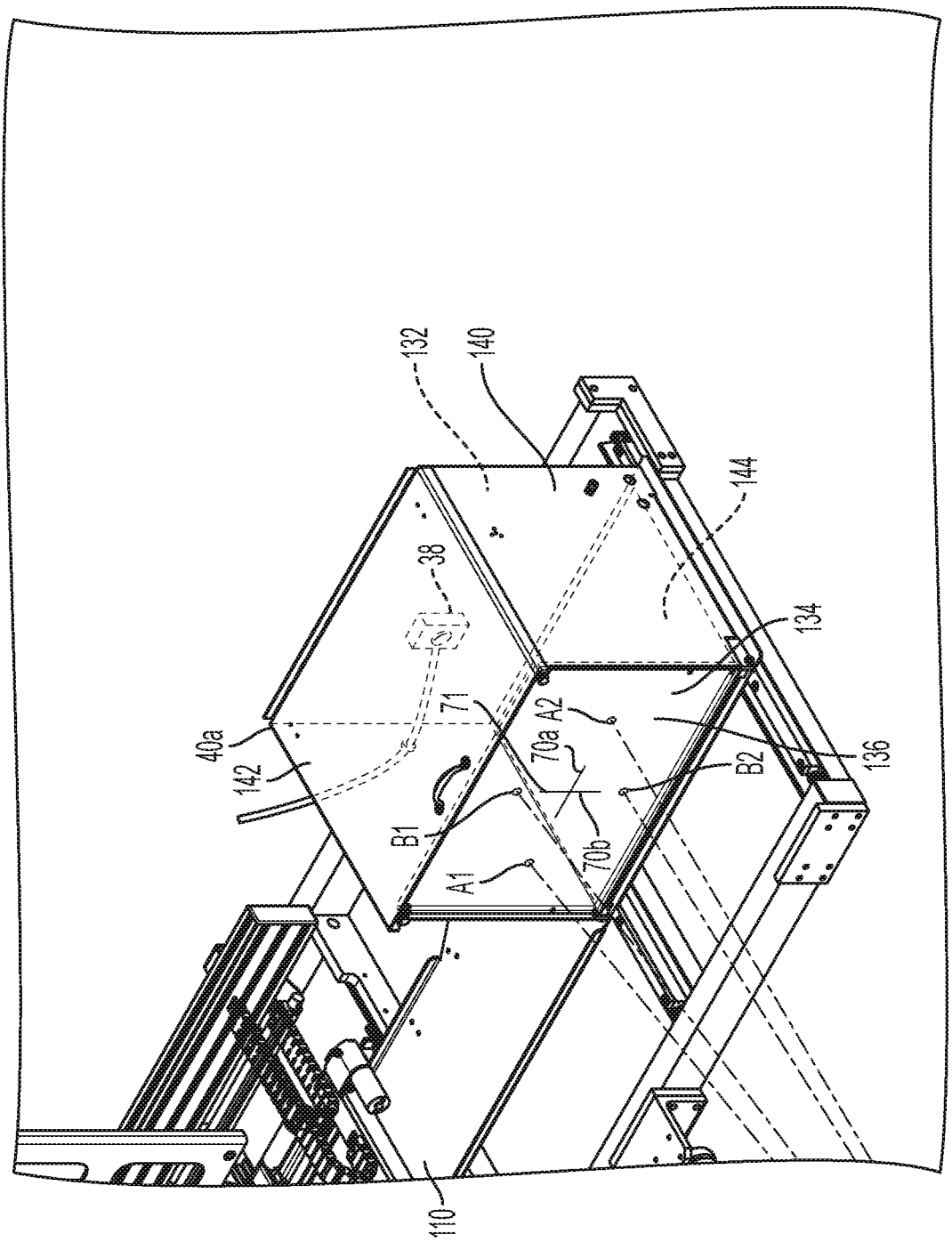
FIG. 7 is a perspective view of an alignment housing of the target adjustment frame of FIG. 1 illustrating an imager disposed therein.
Figure 8:
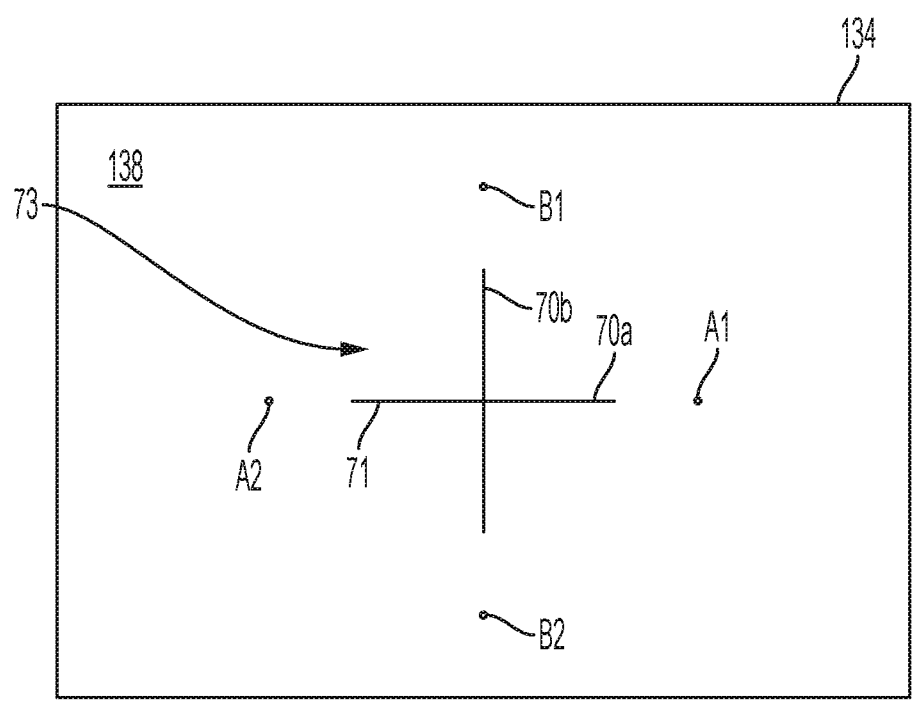
FIG. 8 is an interior view of the imager panel of the alignment housing of FIG. 7.
Figure 9:
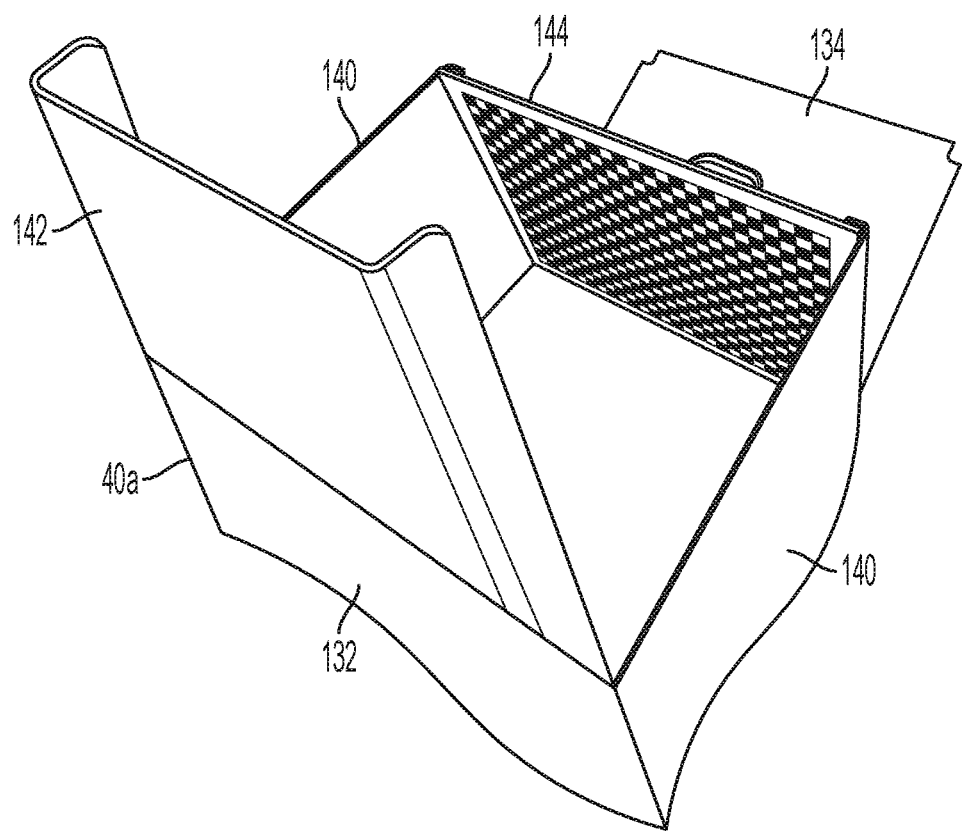
FIG. 9 is an interior perspective view of the alignment housing of FIG. 7 for calibration of the imager.

Details of imager housings 40a, 40b will now be discussed with reference to FIGS. 7-9, where each imager housing 40a and 40b are substantially similar such that only one housing 40 is shown in FIGS. 7-9 and discussed herein. As understood from FIG. 7, a digital imager or camera 38 is mounted to a rear wall 132 of housing 40, where camera 38 comprises a CMOS device or the like. Housing 40 further includes a translucent or semitransparent front panel or image panel 134 having a front surface 136 and a back surface 138, with camera 38 being directed at back surface 138. As discussed in more detail below, the light planes 70a, 70b projected by laser 66 from projector clamps 34 pass through the apertures 88a, 88b, 90a, 90b and 92 of the aperture plates 82 of aperture plate clamps 36 and project onto front surface 136 of panel 134, with camera 38 then imaging the projected light pattern 73 viewable by camera 38 on back surface 138 of panel 134 (FIG. 8). Camera 38 in turn transmits signals regarding the images to controller 42.

Housing 40 further includes sides 140 and a moveable lid 142, with panel 134 being configured to pivot downward about support 110. Panel 134 is also connected to a calibration panel or grid 144, whereby when panel 134 is rotated outwardly, calibration panel 144 is disposed in the fixed upright position in which panel 134 was previously disposed. (See FIG. 9.) Calibration panel 144 may thus be used for calibrating camera 38, such as with respect to the vertical and horizontal orientations and geometric spacings. As discussed in more detail below, this is then used in determining the orientation of the light projected on panel 134 from projector clamps 34, which in turn is used in determining the orientation of vehicle 22 relative to target adjustment frame 24 whereby a target 26 mounted on target adjustment frame 24 may be oriented for calibration of sensors 30 on vehicle 22.

Figure 10:
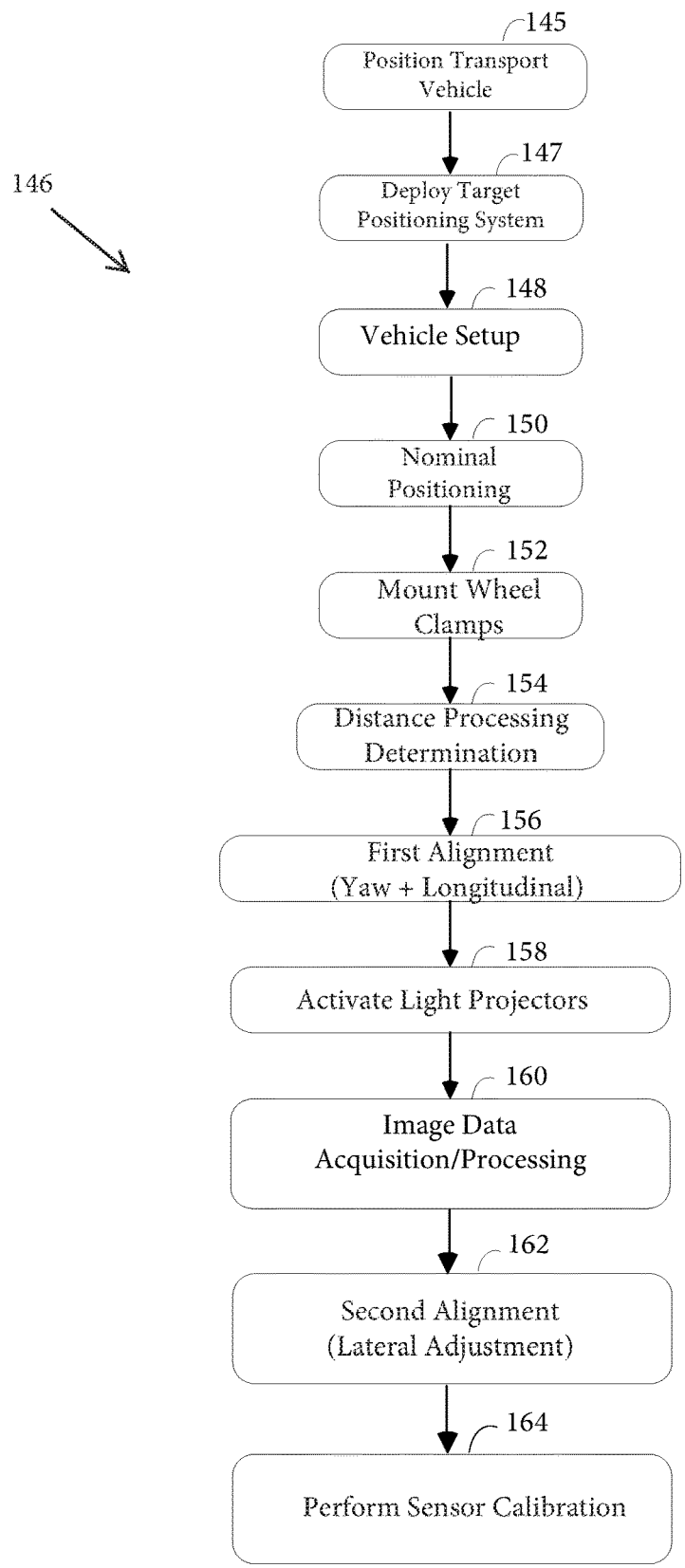
FIG. 10 illustrates an exemplary flow chart of the operation of a mobile vehicle target alignment system in accordance with the present invention.

Descriptions of exemplary use and operation of mobile vehicle target alignment system 20 may be understood with reference to FIG. 10, which illustrates a process 146 including various steps for aligning a target held by target mount 124, such as target 26 or another or additional target, relative to vehicle 22, and in particular relative to sensors 30 of the vehicle 22 such that one or more sensors 30 of vehicle 22 may be calibrated/aligned.

Initially at step 145 transport vehicle 21 is driven to a location at which vehicle 22 is parked and transport vehicle 21 and vehicle 22 are nominally positioned with respect to one another in a longitudinal arrangement relative to the longitudinal axes of the vehicles 21, 22, with the rear of transport vehicle 21 being directed toward vehicle 22. For example, transport vehicle 21 may be backed up to be positioned adjacent vehicle 22, or upon transport vehicle 21 arriving to a location at which vehicle 22 is located, transport vehicle 21 may be parked and vehicle 22 driven into closer proximity to transport vehicle 21. Desirably transport vehicle 21 and vehicle 22 are on approximately flat ground with respect to one another. At step 147 the target positioning system 24 is deployed from the bay 25 of transport vehicle 21 to be generally oriented relative to vehicle 22 as shown in FIG. 1. Step 147 may also involve use of sensor 33 and lift 31 to obtain a vertical orientation or position of target positioning system 24 relative to the ground surface upon which transport vehicle 21 and vehicle 22 are located, as discussed above.

In an initial vehicle setup step 148 vehicle 22 may be prepared, such as by ensuring that tire pressures are nominal and that the vehicle is empty. Step 148 may further include supplying or inputting information to an operator computer device 166 (FIG. 11), such as by being input into a desktop, laptop or tablet by an operator or being obtained directly from a computer of vehicle 22, such as an electronic control unit (ECU) of vehicle 22. Such information may include information regarding specifics of the vehicle 22, such as its make, model and/or other information regarding sensor systems on vehicle 22, and/or include specific information regarding sensors 30 of vehicle 22, the wheelbase dimensions of vehicle 22, or other relevant information for performing calibration/alignment of sensors 30. Still further, operator computer device 166 may prompt an operator as to which target to mount to target mount 124 for calibration of a given vehicle sensor 30.

As discussed herein, an operator may be provided a series of instructions for performing the ADAS calibration process 146 via operator computing device 166 provided with an operator interface, such as a graphical user interface ("GUI"). The instructions may be based on a flow chart that both requests information from the operator regarding the vehicle, such as make, model, VIN and/or details regarding equipment of the vehicle, such as tire and wheel size, types of vehicle options, including sensor options, as well as provides information to the operator regarding the system and vehicle setup for calibration of ADAS sensors. The provided instructions may also inform the operator how to mount and position equipment, as well as provide adjustments to the target adjustment frame 24.

At step 150 vehicle 22 and target adjustment frame 24 are nominally positioned with respect to each other such that vehicle 22 is generally longitudinally oriented relative to frame 24, such as shown in either FIG. 1 in which vehicle 22 is facing forward toward frame 24 or in FIG. 10 in which vehicle 22 is directed rearward toward frame 24. This nominal position may also include, for example, positioning vehicle 22 at a coarse alignment distance relative to frame 24, such as by using a tape measure or other measuring device to obtain a coarse alignment of the target frame 24 to vehicle 22. In a particular aspect, this may include nominally positioning the target adjustment frame 24 relative to an axle of the vehicle 22 that is closest to target adjustment frame 24. This step also includes orienting the front wheels of vehicle 22 in a straight-driving position. Sill further, distance sensors 86 of aperture wheel clamps 36a, 36b may be used to establish a nominal distance, as also referenced below. To the extent that either more or less nominal separation is needed between frame 24 and vehicle 22, either transport vehicle 21 or vehicle 22 may be moved as convenient.

At step 152 projector clamps 34a, 34b are mounted to the wheel assemblies 32 of vehicle 22 that are furthest from target adjustment frame 24 and aperture plate clamps 36a, 36b are mounted to the wheel assemblies 32 that are closet to target adjustment frame 24. Accordingly, in the orientation of FIG. 1 projector clamps 34a, 34b are mounted to the rear wheel assemblies 32 of vehicle 22, and in the orientation of FIGS. 12-14 projector clamps 34a, 34b are mounted to the front wheel assemblies 32, with aperture plate clamps 36a, 36b being mounted to the other wheel assemblies in each case.

At step 154, ToF sensors 86 of aperture plate clamps 36a, 36b on either side of vehicle 22 are activated, such as by way of a signal from controller 42 or by an operator manually activating assemblies 76, such as by way of switches 94. Sensors 86 are directed to generate and acquire signals regarding the distance between each of the aperture plate clamps 36a, 36b and the respective panels 134 of imager housings 40a, 40b, with distance information for both sides then being transmitted by the respective controller assemblies 84, such as back to controller 42.

At step 156, based on the acquired distance information of step 154, controller 42 is operable to activate actuator 112 to rotate support 110 and thereby adjust the rotational orientation of imager housings 40a, 40b as required in order to square the housings 40a, 40b to the longitudinal orientation of vehicle 22. Controller 42 is additionally operable to activate actuator 104 to adjust the longitudinal position of tower assembly 108 relative to the longitudinal orientation of vehicle 22 to a specific distance specified for the sensors 30 of vehicle 22 undergoing calibration, where this distance may be specified, for example, by the OEM procedures for calibration, such as including based on the front axle distance to the target. As such each of the aperture plate clamps 36a, 36b will be at a predefined equidistance from its respective associated imager housing 40a, 40b, to thereby align the particular vehicle sensor 30 at issue to the target. It should be appreciated that distance measurements acquired via distance sensors 86 may be continuously acquired during the adjustments of support 110 and tower assembly 108 until the desired position is achieved in a closed-loop manner. Moreover, upon adjusting into the desired position the distance sensors 86 may be deactivated.

At step 158, lasers 66 of projector clamps 34a, 34b are activated, such as by way of a signal from controller 42 or by an operator manually activating projection assemblies 60, such as by way of switches 72. Each laser 66 generates a cross shaped pattern of light planes 70a, 70b directed at the aperture plates 82 of the respective aperture plate clamps 36a, 36b. When so aligned, the horizontal light planes 70a pass through the vertical apertures 88a, 88b to form light points or dots A1 and A2 on each panel 134. Likewise, the vertical light planes 70b pass through the horizontal apertures 90a, 90b to form light points or dots B1 and B2 on each panel 134. Moreover, a portion of the intersecting light planes 70a, 70b of each laser 66 pass through the central aperture 92 of the respective aperture plates 82 to form a cross pattern 71. The dots A1, A2 and B1, B2, as well as the cross pattern 71, thus form a light pattern 73 on the panels 134, which is viewable by camera 38 on surface 138 (FIG. 8). It should be appreciated that alternative light patterns may be employed, such as may be generated by alternative light projectors and/or different aperture plates, for determining the orientation of the vehicle 22 relative to target adjustment frame 24.

At step 160, the cameras 38 of each of the imager housings 40a, 40b image the back surfaces 138 of the respective panels 134 to obtain images of the light pattern formed on the panels 134 by the lasers 66 as the light planes 70a, 70b pass through the aperture plates 82. The images taken by cameras 38 are transmitted to controller 42, with controller 42 thus being able to define a proper orientation for the target mount 124, and associated target 26, relative to the current position of the vehicle. For example, controller 42 is able to determine the location of the vertical center plane of vehicle 22 relative to target adjustment frame 24 via the respective light patterns 73. The controller 42 may first identify the dots A1, A2 and/or B1, B2, including via use of the cross pattern 71 as a reference for identifying the imaged dots. Controller 42 may then resolve the relative location of dots A1, A2 and/or B1, B2 on each of the panels 134 based on the predetermined known calibration of camera 38 established via calibration panel 144. For example, controller 42 may determine the center line location of vehicle 22 based on the known spacing of housings 40a, 40b relative to the Z-axis and the determination of the relative location of the dots A1, A2 formed on panels 134.

In particular, various vehicle alignment parameters may be determined via light patterns 73. For example, a rolling radius may be determined via the dots B1, B2 and the known symmetrical spacing of apertures 90a, 90b relative to each other about the axis defined by shaft 78, which is in alignment with the axis of the associated wheel assembly 32 to which the clamp 36 is mounted, thus enabling determination of the vertical radial distance from the ground to the axes of the front wheel assemblies 32 of vehicle 22. The rolling radius value from both sides of the vehicle 22 may be obtained and averaged together. Rear toe values may also be obtained from dots B1, B2 with respect to A1, A2 via the vertical laser planes 70b passing through the horizontal apertures 90a, 90b, where a single measurement would be uncompensated for runout of the rear wheel assemblies 32. In addition, the vehicle centerline value may be obtained via the dots A1, A2 formed by laser planes 70a passing through the vertical apertures 88a, 88b on each side of the vehicle 22.

At step 162, based on the acquired vehicle position or center plane information of step 160, controller 42 is operable to activate actuator 126 to adjust the lateral orientation of the target mount 124, and thus the target 26 mounted thereon, to a desired lateral position relative to vehicle 22, and in particular relative to a particular sensor 30 of vehicle 22. For example, a sensor 30 positioned on vehicle 22 may be offset from the vehicle centerline, with system 20 taking this into account, such as based on the vehicle make, model and equipped sensors by way of the information obtained at process step 148 discussed above, whereby target 26 may be positioned in a specified position relative to the sensor 30, such as specified by OEM calibration procedures. As such, system 20 may thus not only align the target 26 with respect not to the XYZ axis of the vehicle, but with respect to a sensor mounted on the vehicle.

In addition to the above, the vertical height of target mount 124 is positioned via actuator 120 to be in a predefined height for a given sensor 30 of vehicle 22, such as specified by an OEM calibration procedure. This height may be based on, for example, a vertical height above the ground surface upon which transport vehicle 21 and vehicle 22 are positioned, including based on a determined distance that target adjustment stand 24 is above the ground surface via distance sensor 33. Alternatively, a chassis height or fender height of vehicle 22 may be determined to further aid in orientating the target 26. For example, the chassis or fender height may be determined, such as at multiple locations about vehicle 22, such that an absolute height, pitch, and yaw of a vehicle mounted sensor may be determined, such as a LDW or ACC sensor. Any conventional method for determining a chassis or fender height of vehicle 22 may be used. For example, one or more leveled lasers may be aimed at targets magnetically mounted to vehicle 22, such as to the fenders or chassis. Alternatively, a non-contact system may be used that does not utilize mounted targets, but instead reflects projected light off of portions of the vehicle itself. Still further, rather than determining a vertical height of vehicle 22 using a chassis or fender height measurement, a vertical height determination or reference of vehicle 22 may be made based on or from a vehicle feature, such as an emblem on a vehicle, such as a hood or front bumper emblem. For example, a laser 33a (FIG. 5) may be mounted to target adjustment stand 24 and configured to project a line onto vehicle 22 whereby target adjustment stand 24 may be jogged up and down, such as via lift 31, to orient the line from laser 33a on an appropriate feature of vehicle 22. It should be appreciated that laser 33a may be alternatively located and that alternative vertical adjustment of target adjustment stand 24 may be made, such as movement of actuator 120.

Finally, at step 164, the calibration of sensors 30 of vehicle 22 may be performed, such as in accordance with the OEM calibration procedures. This may involve, for example, operator computing device 166 communicating signals to one or more ECUs of vehicle 22 to activate an OEM calibration routine, where the particular target required for calibration of a given vehicle sensor 30 has thus been properly positioned with respect for the sensor 30 in accordance with the calibration requirements.

It should be appreciated that aspects of process 146 may be altered, such as in order, and/or combined and still enable calibration/alignment of sensors 30 in accordance with the present invention. For example steps 148 and 150, or aspects thereof, may be combined. Still further, simultaneous operation of various steps may occur. This includes, as noted, the use of distance sensors 86 for determining a nominal distance, in which case wheel clamps 34, 36 would be mounted to wheel assemblies 32, whereby at least steps 150 and 152 may be combined.

Further with regard to steps 160 and 162, additional procedures and processing may be performed in situations in which it is desired or required to account for a thrust angle of the vehicle 22 during calibration of vehicle sensors. In particular, with regard to the orientation of FIG. 1, with vehicle 22 facing forward toward target adjustment frame 24, the rear axle thrust angle of the non-steering rear wheels may be addressed. To do so, in like manner as discussed above, camera 38 takes initial images of the light pattern formed on the back surfaces 138 of panels 134 by the lasers 66 as the light planes 70a, 70b pass through the aperture plates 82, with the image data being transmitted to controller 42. Subsequently, vehicle 22 is caused to move either forward or backward such that the wheel assemblies 32 rotate, such as by 180 degrees or more or less. After vehicle 22 is moved, camera 38 takes additional images of the light pattern formed on the back surfaces 138 of panels 134 by the lasers 66 as the light planes 70a, 70b pass through the aperture plates 82, with the image data also being transmitted to controller 42. The runout-compensated thrust angle of vehicle 22 can be determined and accounted for by controller 42 based on the orientation of the vertically disposed dots B1, B2 between the first and second images for each of the cameras 38 on either side of vehicle 22 based on the runout of the wheels 32 with respect to A1, A2.

Accordingly, after the vehicle has been moved, a second vehicle centerline value is obtained via the horizontal laser planes 70a passing through the vertical apertures 88a, 88b from each of the left and right sides of the vehicle 22. The second alignment measurement values additionally include determining second rear toe values via the vertical laser planes 70b passing through the horizontal apertures 90a, 90b, which values are uncompensated for runout of the rear wheel assemblies. Based on the first and second vehicle centerline values, runout-compensated alignment values are determined. This includes rear runout-compensated rear toe and thrust angles.

Upon obtaining the alignment values the vehicle 22 is rolled into or back into the original starting calibration position such that wheel assemblies 32 rotate 180 degrees opposite to their original rotation, with cameras 38 again taking images of the light pattern. Controller 42 is thereby able to confirm that dots B1, B2 have returned to the same position on panels 134 as in the original images. Alternatively, vehicle 22 may be located in an initial position and then rolled into a calibration position, such as to have 180 degrees of rotation of the wheel assemblies 32, with the vehicle 22 thrust angle compensation determination being made based on images being taken in the initial and calibration positions. Upon determination of the thrust angle, the determined thrust angle may be used by controller 42 to compensate the specific position at which target 26 is positioned via controller 42 activating one or more of the actuators of target adjustment frame 24. For example, the yaw of tower assembly 109 may be adjusted to compensate for the rear thrust angle. With the vehicle 22 properly aligned with the target frame 80, and the rear thrust angle thus determined, calibration and alignment procedures may be carried out. Vehicle 22 may be rolled forward and backward, or vice versa, by an operator pushing the vehicle.

Figure 11:
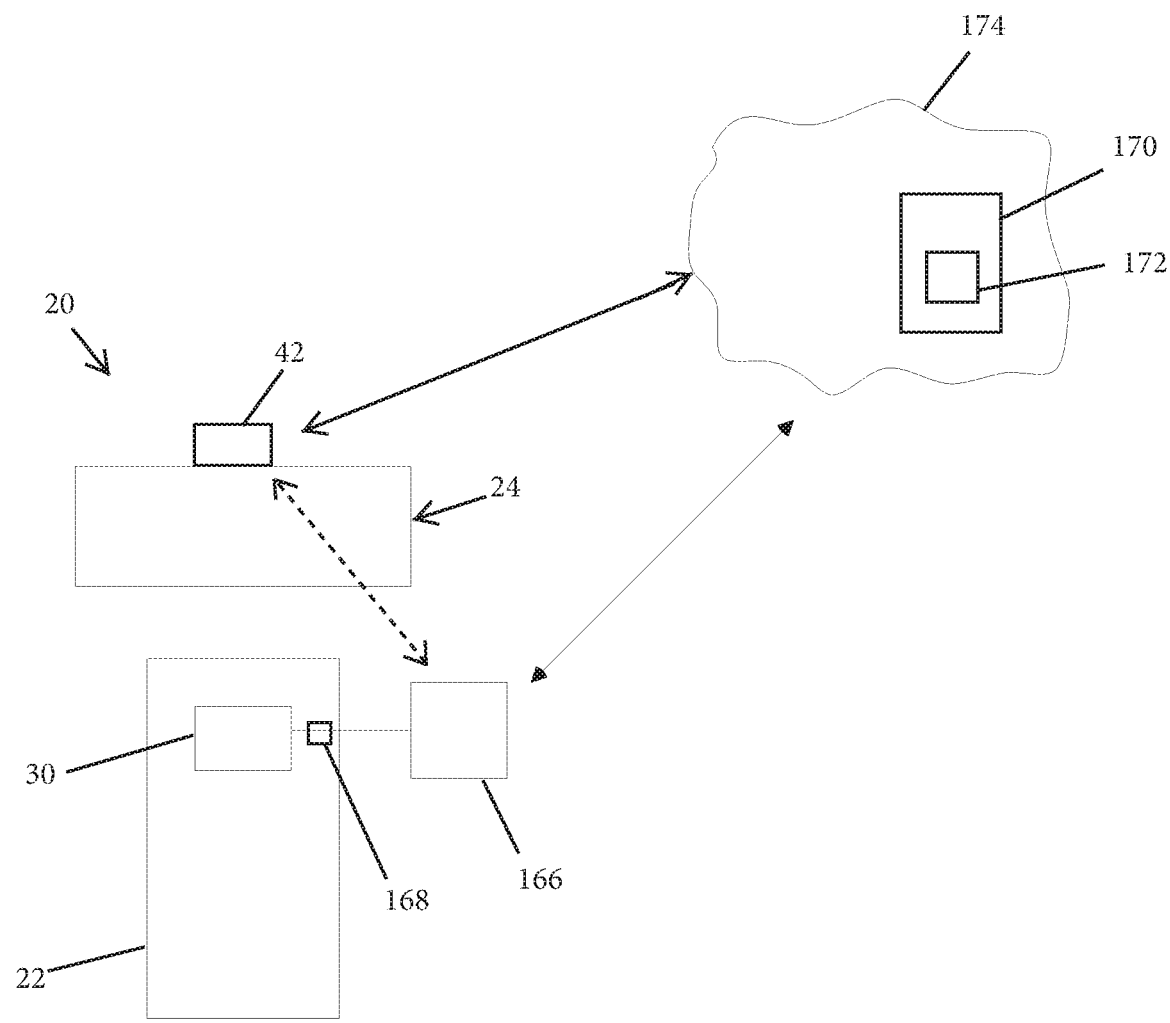
FIG. 11 is a schematic illustration of remote processes operations of a mobile vehicle target alignment system in accordance with the present invention.

Alignment and calibration system 20 may be configured to operate independently of external data, information or signals, in which case the computer system of the embodiment comprises the controller 42 that may be programmed for operation with various makes, models and equipped sensors, as well as may include the operator computer device 166. In such a standalone configuration, as illustrated in FIG. 11, operator computer device 166 may interface with vehicle 22, such as via one or more ECUs 168 of vehicle 22 that may be interfaced via an on-board diagnostic (OBD) port of vehicle 22, as well as with controller 42 to provide step-by-step instructions to an operator. Alternatively, operator computer device 166 may receive information input by an operator regarding vehicle 22, such as make, model, vehicle identification number (VIN) and/or information regarding the equipped sensors, with device 166 communicating such information to controller 42.

Alternative to such a standalone configuration, FIG. 11 also discloses an exemplary embodiment of a remote interface configuration for system 20 where system 20 is configured to interface with a remote computing device or system 170, such as a server, and one or more remote databases 172, such as may be accessed via an Internet 174, whereby the computer system thus further comprise the remote computing device 170. For example, remote computing device 170 incorporating a database 172 accessed via the Internet, may be used to run a calibration sequence through one or more engine control units ("ECUs") of the vehicle 22 to calibrate one or more ADAS sensors pursuant to pre-established programs and methodologies, such as based on original factory-employed calibration sequences or based on alternative calibration sequences. In such a configuration, controller 42 need not contain programs related to setup parameters for particular makes, models and equipped sensors, nor is controller 42 required to perform data analysis from distance sensors 86 or cameras 38. Rather, an operator may connect operator computer device 166 to an ECU 168 of vehicle 22, with computer device 166 then transmitting acquired vehicle specific information to computing system 170, or alternatively an operator may enter information directly into operator computer device 166 without connecting to vehicle 22 for transmitting to computing system 170. Such information may be, for example, make, model, vehicle identification number (VIN) and/or information regarding the equipped sensors. Computing system 170 may then provide the necessary instructions to the operator based on specific procedures required to calibrate sensors as set forth in databases 172 and specific processing performed by computing system 170, with control signals then transmitted to controller 42. For example, computing system 170 may provide instructions to operator regarding the nominal position at which to locate vehicle 22 from target adjustment frame 24 and regarding installation of the wheel clamps 34, 36.

Computing system 170 may further send control signals to perform the alignment procedure. For example, computing system 170 may send control signals to controller 42 to activate actuator 120 to position the target mount 124 at the desired vertical height for the particular sensor 30 that is to be calibrated. Computing system 170 may also send control signals to controller 42, with controller 42 selectively wirelessly activating distance sensors 86, with the information obtained from distance sensors 86 in turn transmitted back to computing system 170. Computing system 170 may then process the distance information and send further control signals to controller 42 for activating the actuators 104 and 112 for the yaw and longitudinal alignment, in like manner as discussed above. Upon confirmation of that alignment step, computing system 170 may then transmit control signals to controller 42 for activating lasers 66, with controller 42 in turn transmitting image data signals to computing system 170 based on images of the light patterns formed on panels 134 detected by cameras 38. Computing system 170 in turn processes the image data signals to determine a lateral alignment, and sends control signals to controller 42 for activating actuator 126 to achieve the predefined lateral positioning of the target held by target mount 124.

Databases 172 may thus contain information for performing calibration processes, including, for example, information regarding the specific target to be used for a given vehicle and sensor, the location at which the target is to be positioned relative to such a sensor and vehicle, and for performing or activating the sensor calibration routine. Such information may be in accordance with OEM processes and procedures or alternative processes and procedures.

In either embodiment various levels of autonomous operation by system 20 may be utilized, such as with regard to automatically activating distance sensors 86 and/or light projectors 66 as compared to system 20 providing prompts to an operator, such as by way of operator computing device 166, to selectively turn distance sensors 86 and/or light projectors 66 on and off. This applies to other steps and procedures as well.

Figure 12:
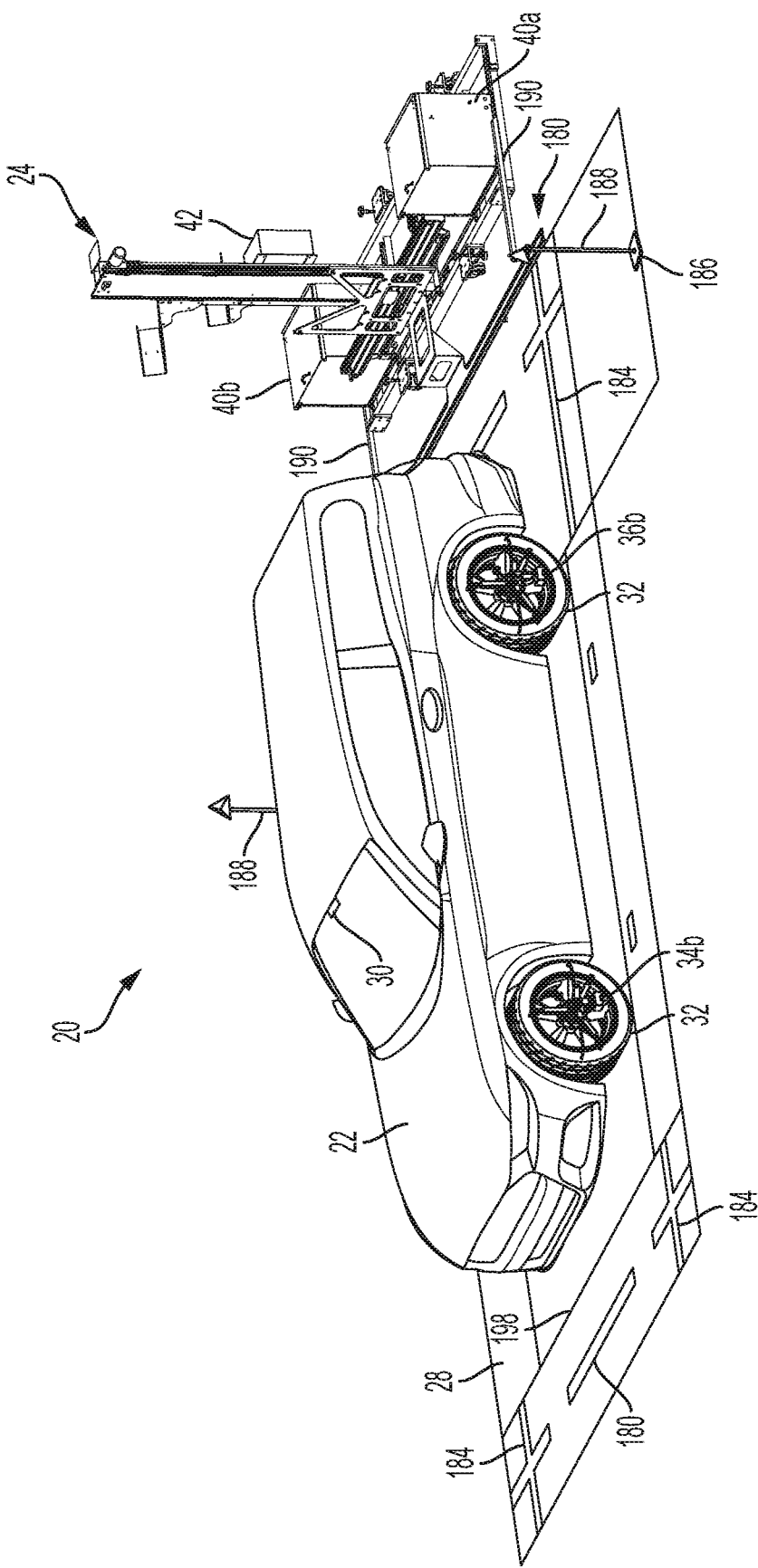
FIG. 12 is a perspective view of the transport mounted vehicle target alignment system of FIG. 1 equipped with an adjustable ground target assembly illustrating the vehicle in a reversed orientation relative to the target adjustment frame.
Figure 13:
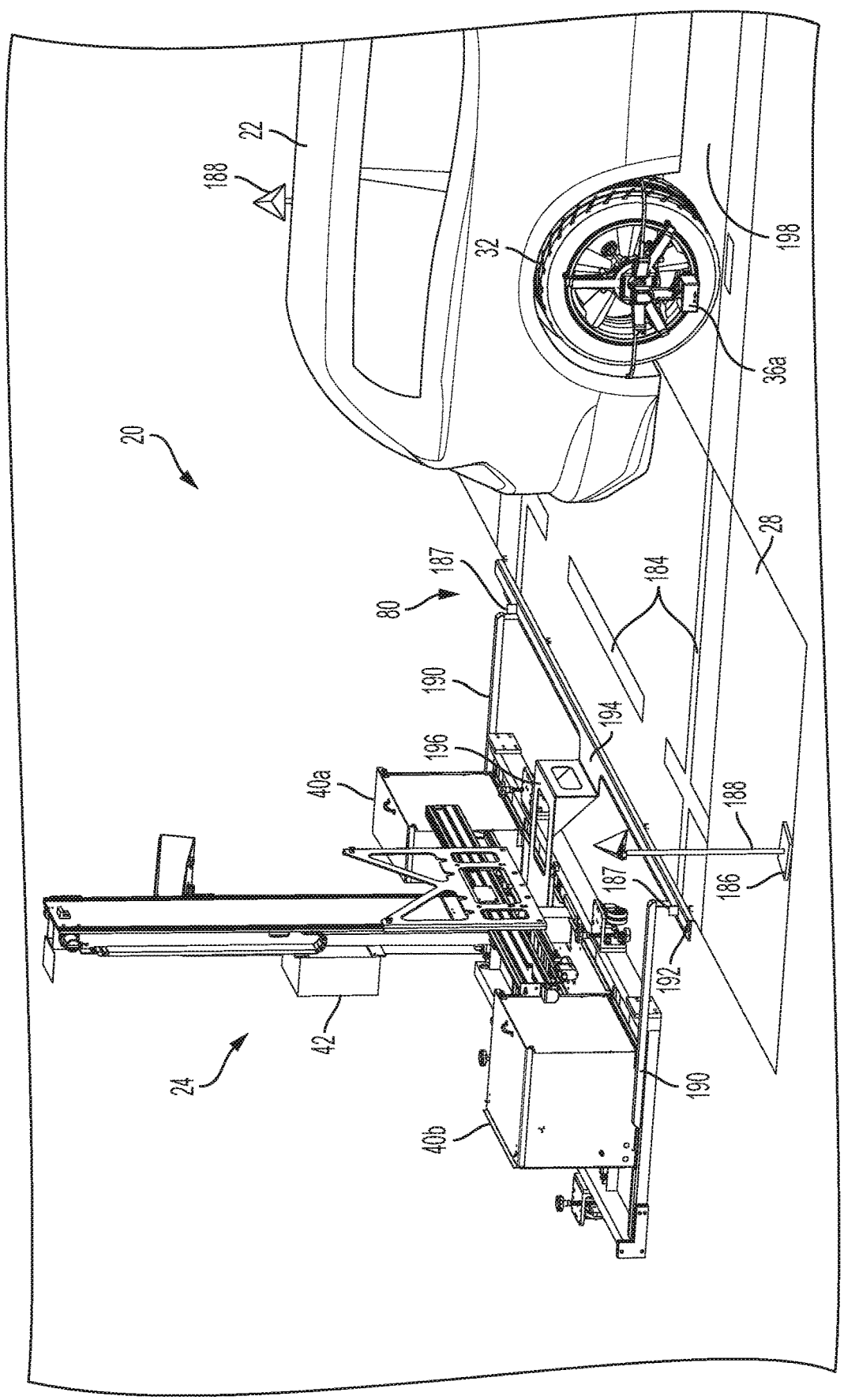
FIG. 13 is a close-up perspective view of the system and orientation of FIG. 12 disclosing the adjustable ground framework for positioning of the mat relative to the vehicle.
Figure 14:
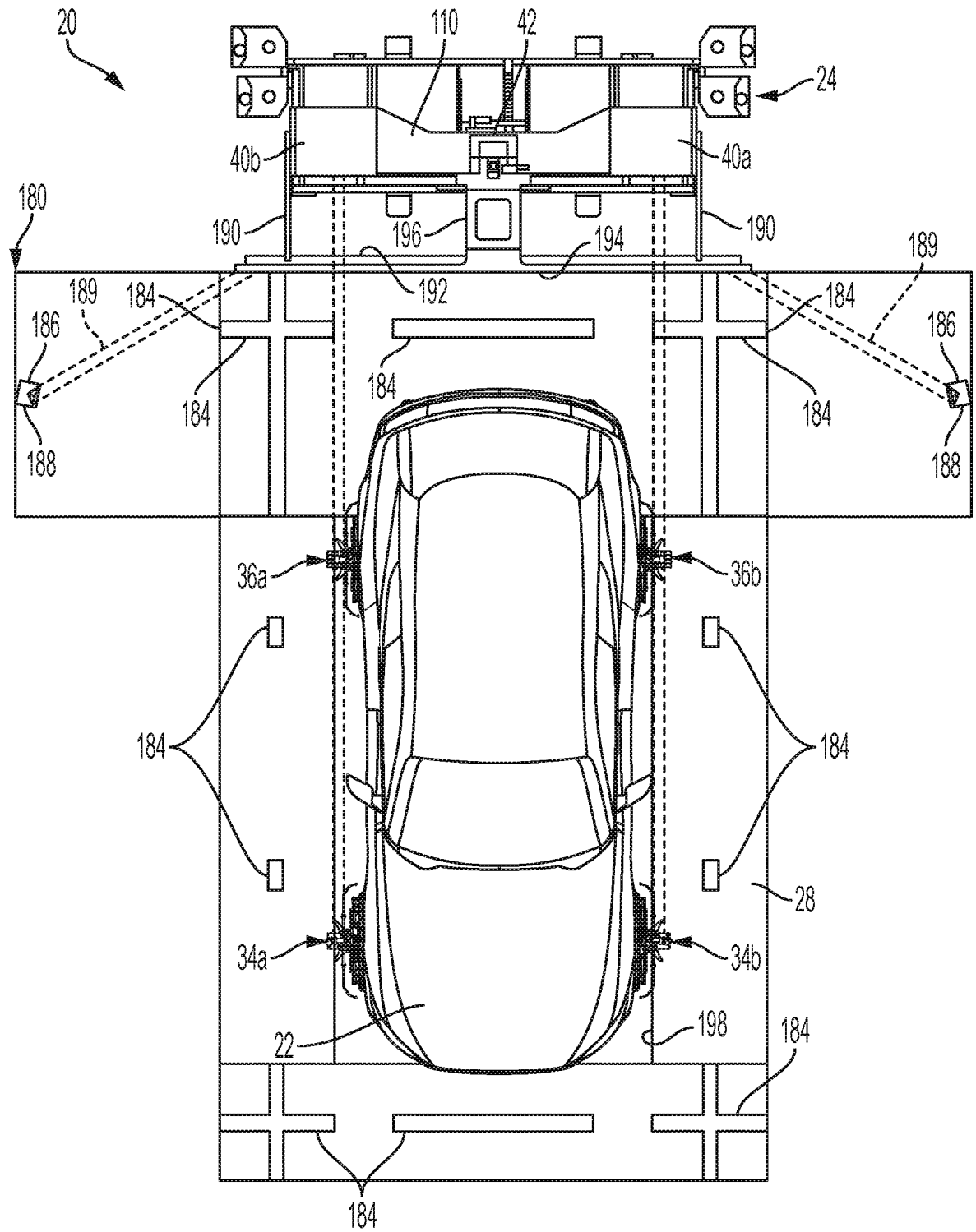
FIG. 14 is an overhead view of the vehicle target alignment system and orientation of FIG. 12.

Referring now to FIGS. 12-14, system 20 may additionally include an adjustable ground target assembly 180 integrated with target adjustment frame 24. Ground target assembly 180 includes a mat 28 that is adjustably positionable about vehicle 22, where mat 28 may include various targets 184 disposed directly on mat 28, such as may be used for calibration of sensors configured as exterior mounted cameras on vehicle 22 that are disposed about vehicle 22, such as cameras used for a conventional surround view system mounted in the bumpers and side view mirrors. In the illustrated embodiment, mat 28 of ground target assembly 180 additionally includes mounting locations or indicators 186 for locating targets that may be disposed on mat 28, such as targets 188 that are configured as trihedrals mounted on posts for calibration of rear radar sensors on vehicle 22.

In the illustrated embodiment, ground target assembly 180 includes a pair of arms 190 that are securable to the imager housing support 110, with arms 190 extending outwards toward vehicle 22 and being connected to and supporting a lateral rail 192. A moveable rail 194 is disposed in sliding engagement with rail 192, with rail 194 including a bracket 196 for selective connection with target mount 124 when target mount 124 is in a lowered orientation, as shown in FIG. 13. Mat 28 in turn is connected to rail 194, such as via fasteners or pegs. In the illustrated embodiment mat 28 is constructed of a flexible material such that it may be rolled up when not in use, and surrounds vehicle 22 and has an opening 198 wherein vehicle 22 is supported on the ground at opening 198. Mat 28 may be constructed as a single integrated piece, or may be constructed as separate segments that are secured together.

Accordingly, the above discussed process for aligning target mount 24 may be used to position mat 28 about vehicle 22 for calibration of sensors disposed on vehicle 22, including based on known dimensions of mat 28 and locations of targets 180 on mat 28. For example, vehicle 22 is initially nominally positioned relative to target frame 24 and wheel clamps 34, 36 are attached to vehicle 22, with process 146 being employed to position arms 190 and rail 194 as required for calibration of a given sensor on a vehicle 22, including via longitudinal and rotational movement of support 110 by actuators 104 and 112, and laterally with respect to the longitudinal orientation of vehicle 22 by way of actuator 126 that moves target mount 124 along rail 122, where movement of target mount 124 will in turn cause rail 194 to slide along rail 192. Mat 28 may then be secured to rail 194 and rolled out around vehicle 22. Alternatively, mat 28 may be moved by being dragged along the ground into a desired orientation. Upon mat 28 being positioned into a desired orientation, mat 28 may also be checked, such as by an operator, to be sure its sides disposed on either side of vehicle 22 are parallel to each other. For example, as understood from FIG. 13, lasers 187 may be mounted to rail 192 and/or rail 194, with lasers 187 being square thereto. Lasers 187 may be configured for alignment with a straight edge of mat 28 whereby an operator may activate lasers 187 to check and adjust as necessary that mat 28 is properly square relative to target adjustment frame 24.

As noted, mat 28 may also include locators 186 for positioning of targets, such as targets 188. Locators 186 may comprise receptacles in the form of cutouts in mat 28 or printed markings on mat 28 for indicating the correct positional location for placement of targets 188. Still further, locators 186 may comprise embedded receptacles in the form of fixtures, such as pegs, or grooves, or the like, to which targets 188 may connect. Still further, instead of mat 28, or in addition to mat 28, a target assembly may be equipped with rigid arms 189 (FIG. 14), with the arms 189 extending between a moveable rail, such as rail 194, and a target, such as target 188. As such, the alignment and calibration system 20 may be used to position alternative targets about vehicle 22.

An alternative ground target assembly as compared to assembly 180 may be employed within the scope of the invention. For example, a sliding rail such as sliding rail 194 may be provided with telescoping ends to increase its length, such as to accommodate differently sized mats. Still further, a sliding rail may be configured for lateral movement in an alternative manner than by way of connection to target mount 124 and actuator 126. For example, an actuator may alternatively be mounted to arms 190 extending from support 110.

FIGS. 12-14 additionally illustrate that system 20 may be used in connection with calibration of non-forward facing sensors, whereby a vehicle such as vehicle 22 may be oriented rearwardly relative to target adjustment frame 24. In such an orientation projector wheel clamps 34a, 34b are mounted to the front wheel assemblies 32 of vehicle 22, and aperture plate wheel clamps 36a, 36b are mounted to the rear wheels, with the light projectors 66 oriented to project toward imager housings 40a, 40b on target adjustment frame 24. This orientation may be used for the calibration of ADAS sensors configured as rear cameras, rear radar, and the like.

Figure 15:
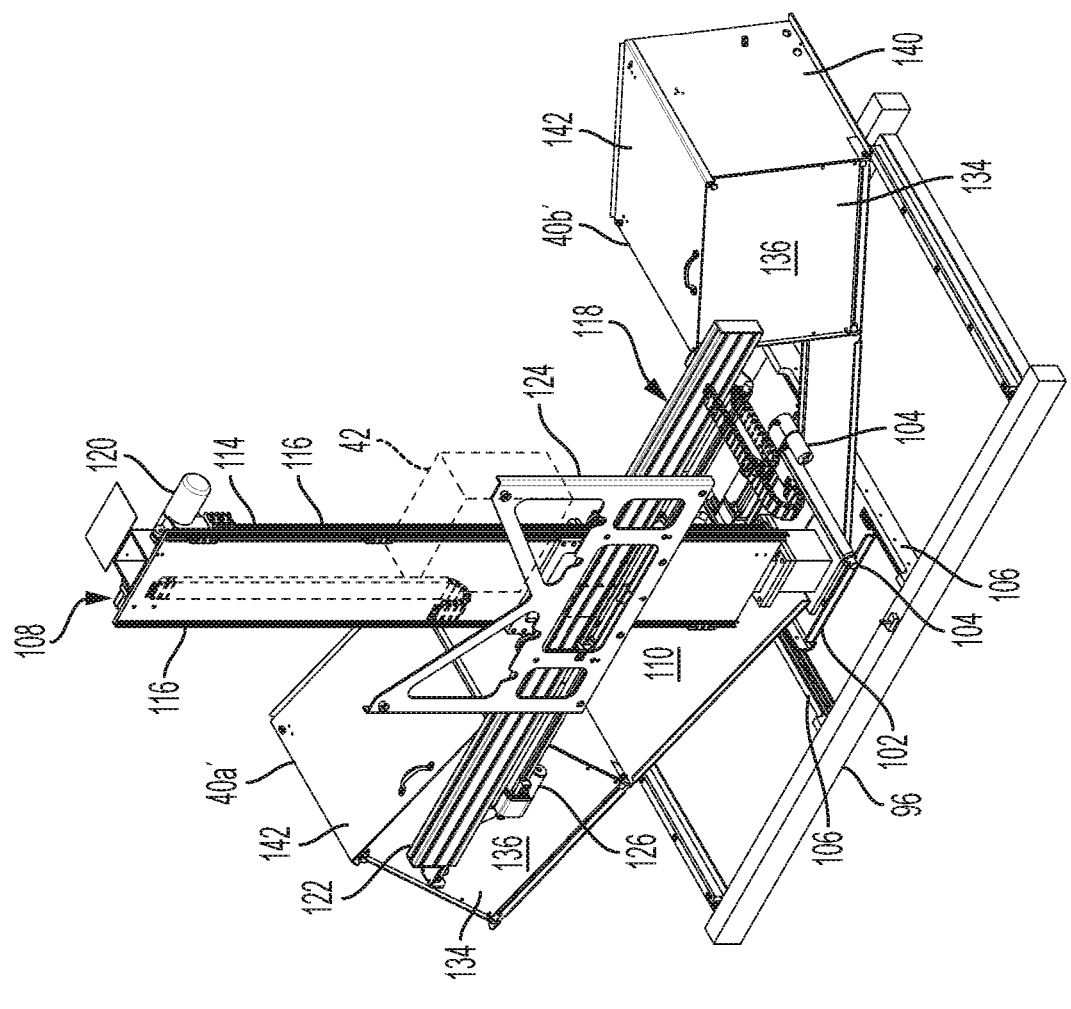
FIG. 15 is a perspective view of an alternative target positioning system in accordance with the present invention.

It should further be appreciated that system 20 may include variations in the construction and operation within the scope of the present invention. For example, with reference to FIG. 15, an alternative target positioning system 24' may be employed in which housings 40a', 40b' are pivotally mounted on target adjustment stand 24'. Housings 40a', 40b' may thus be pivoted upwards into a transport position when not in use and stored within transport vehicle 21, and pivoted downwards when in use. Still further, base frame 96' may be made smaller, with target positioning system 24' otherwise sharing common construction, features and operations with target adjustment stand 24. Target adjustment stand 24' may thus be installable within bay 25 of transport vehicle 21 without needing to be rotated relative to its orientation in use and the longitudinal axes of vehicle 21.

Figure 16:
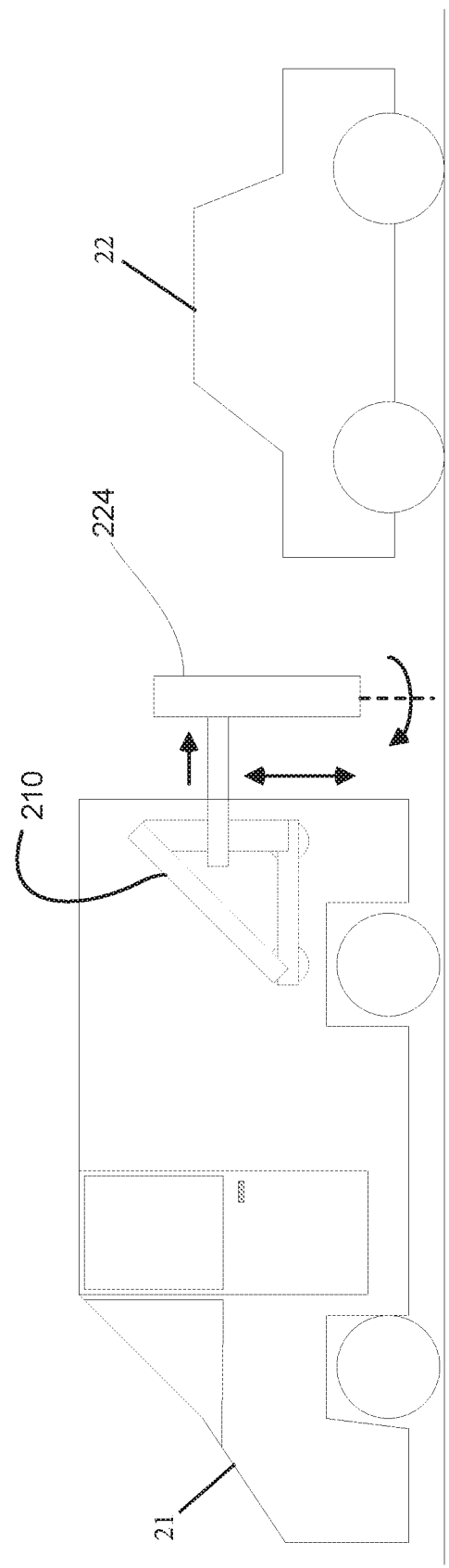
FIG. 16 is a side elevation view of an alternative installation of a target positioning system within a transport vehicle in accordance with the present invention.
Figure 17:
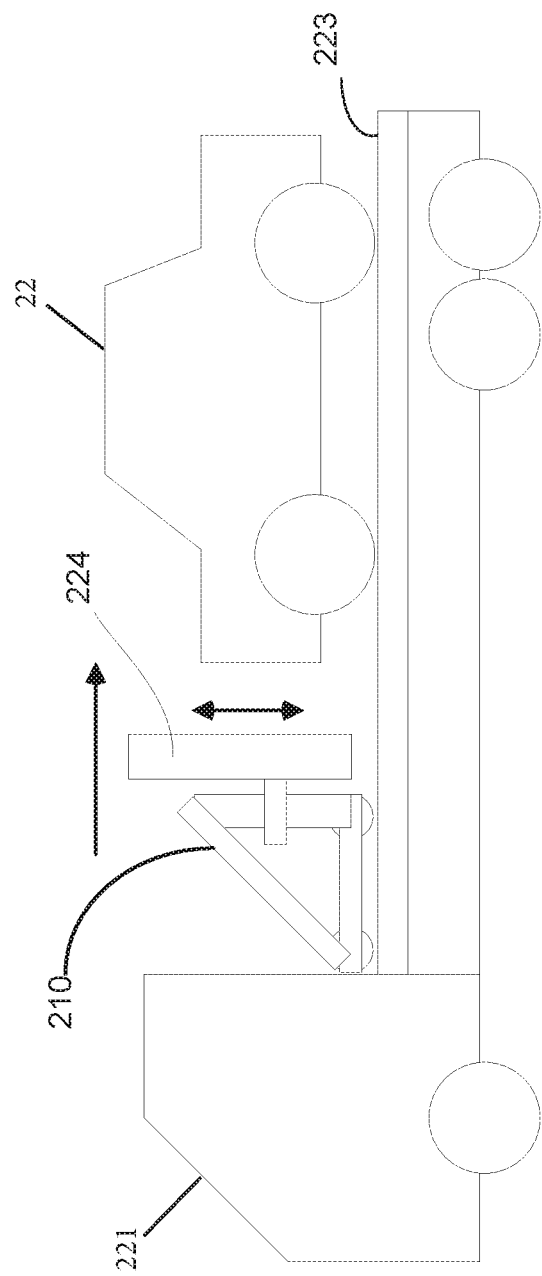
FIG. 17 is a side elevation view of an alternative transport vehicle and target positioning system in accordance with the present invention.
Figure 18:
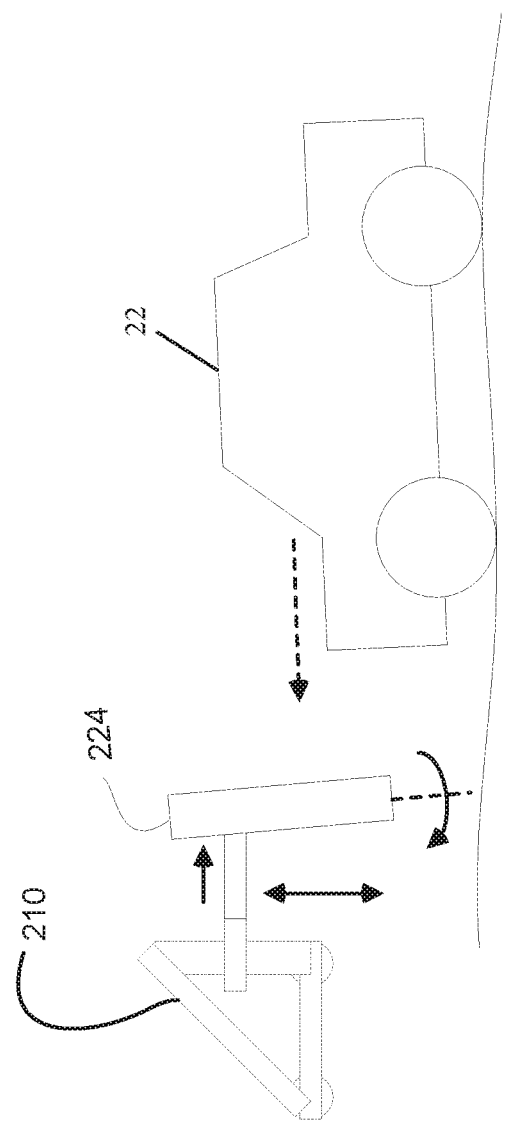
FIG. 18 is a side elevation view illustrating additional adjustment controls for a target positioning system is accordance with the present invention.

Moreover, as noted above, the target positioning system may be alternatively arranged within a transport vehicle. As shown in FIG. 16, for example, a slidable adjustment frame mechanism 210 is provided to which is mounted target positioning system 224, where target positioning system 224 may be constructed in accordance with target positioning system 24 or 24' discussed above. Still further, alternative transport vehicles may be used, such as for example transport vehicle 221 shown in FIG. 17, which is configured as a flatbed truck. In such a configuration, vehicle 22 is pulled onto the pivoting bed 223 of transport vehicle 221. Bed 223 provides a level surface, however, depending on the vehicle 22 and sensor arrangement, greater distance between target positioning system 224 and vehicle 22 may be required. It should further be appreciated that, with reference to FIG. 18, target positioning system 224 may additionally be configured to accommodate for uneven ground surface upon which the transport vehicle 21 and vehicle 22 are disposed, such as providing for further adjustment in the attitude of target positioning system 224 relative to vehicle 22. For example, further adjustment in the roll and/or pitch of target positioning system 224 relative to vehicle 22 may be provided. This may be accomplished, for example, via the actuator of lift 31, the securement of a target positioning system 224 to the adjustment frame mechanism 210, or by additional actuators provided on target positioning system 224.

Still further, target mount 124 or an alternatively constructed target mount may simultaneously hold more than one target, in addition to being able to hold different targets at separate times. Still further, target mount 124 may hold a target configured as a digital display or monitor, such as an LED monitor, whereby such a digital monitor may receive signals to display different target patterns as required for specific sensor calibration processes. Moreover, target adjustment frame may optionally or alternatively include a passive ACC radar alignment system configured for aligning the ACC radar of a vehicle. This may comprise, for example, a modified headlight alignment box having a Fresnel lens mounted to the target stand or frame, with the alignment box configured to project light onto a reflective element of an ACC sensor of the vehicle, with the projected light being reflected back to the alignment box. Alternatively configured wheel clamp devices may be used relative to wheel clamps 34 and 36. For example, projection assembly 60 and aperture assembly 76 may be incorporated into a known conventional wheel clamp, or other wheel clamp specifically constructed to mount in a known orientation to a wheel assembly.

Further changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A mobile system for aligning a target to an equipped vehicle for calibration of a sensor on the equipped vehicle, said system comprising: a transport vehicle and a target adjustment stand carried by said transport vehicle, wherein said transport vehicle comprises a motorized vehicle comprising a van or a truck that is configured to be driven over roads to transport said target adjustment stand to an equipped vehicle for calibration of a sensor on the equipped vehicle, and wherein said target adjustment stand is moveably mounted to said transport vehicle; said target adjustment stand including a base and a target mount moveably mounted on said target adjustment stand with said target mount configured to support a target, said target adjustment stand further including a plurality of actuators configured to selectively move said target mount relative to said base; a computer system, said computer system configured to selectively actuate said actuators to position said target relative to the equipped vehicle when the equipped vehicle is positioned in front of said target adjustment stand, with said target mount being moveable by said actuators vertically, and rotationally a bout a vertical axis, and longitudinally and laterally with respect to a longitudinal axis of the equipped vehicle when said target adjustment stand is positioned to be intersected by the longitudinal axis of the equipped vehicle; wherein said computer system is configured to determine the orientation of the equipped vehicle relative to said target adjustment stand and to actuate said actuators responsive to the determination of the orientation of the equipped vehicle relative to said target adjustment stand to position said target relative to a sensor of the equipped vehicle whereby the sensor is able to be calibrated using the target.

2. The system of claim 1, further comprising:
two rearward wheel clamps and two forward wheel clamps, wherein said rearward wheel clamps each include a light projector and are configured for mounting to the opposed wheel assemblies on opposite sides of the equipped vehicle furthest from said target adjustment stand, and wherein said forward wheel clamps each include an aperture plate and are configured for mounting to the opposed wheel assemblies on opposite sides of the equipped vehicle closest to said target adjustment stand;
wherein said light projectors are configured to selectively project light at respective ones of said aperture plates, with each said aperture plate including at least one aperture through which the projected light is directed at said target adjustment stand;
wherein said target adjustment stand further comprises a pair of imagers with each said imager operable to image projected light passing through respective ones of said aperture plates; and
wherein said computing system is operable to determine the orientation of the equipped vehicle relative to said target adjustment stand based on said images of projected light obtained by said imagers.

3. The system of claim 2, further including a pair of spaced apart imager panels, wherein projected light passing through said aperture plates is projected onto respective ones of said imager panels to form a light pattern on each said imager panel, and wherein said imagers are configured to image said light patterns.

4. The system of claim 3, wherein said imager panels are translucent, and wherein projected light passing through said aperture plates is directed onto a front surface of said imager panels with said imagers configured to image said light pattern from a back surface of said imager panels.

5. The system of claim 4, further including a pair of imager housings, wherein each said imager housing includes one of said imager planes and wherein one of each said imagers is mounted within a respective one of said imager housings.

6. The system of claim 2, wherein a pair of opposed wheel clamps selected from said forward wheel clamps and said rearward wheel clamps each further include a distance sensor configured to obtain distance information of said opposed wheel clamps relative to spaced apart portions of said target adjustment stand, and wherein said computer system is operable to determine the orientation of the equipped vehicle relative to said target adjustment stand based at least in part on the distance information from each said distance sensor.

7. The system of claim 1, wherein said target adjustment stand is moveable between a deployed position and a transport position, and wherein said target adjustment stand is positioned adjacent the equipped vehicle in said deployed position and is stowed for transport in said transport position.

8. The system of claim 1, wherein said computer system comprises a controller disposed at or adjacent said target adjustment stand, and wherein said controller is configured to selectively actuate said base member actuator and said tower actuator.

9. The system of claim 8, wherein said computer system further comprises a remote computing device, wherein said remote computing device is configured to determine the orientation of the equipped vehicle relative to said target adjustment stand and transmit control signals to said controller for selectively actuating said base member actuator and said tower actuator.

10. A method of calibrating a sensor of an equipped vehicle by aligning a target with the sensor of the equipped vehicle, said method comprising: transporting a target adjustment stand to the equipped vehicle using a transport vehicle, wherein the transport vehicle comprises a motorized vehicle configured as a van or a truck that is configured to be driven over roads to transport the target adjustment stand to the equipped vehicle, and wherein the target adjustment stand is moveably mounted to the transport vehicle; longitudinally arranging the transport vehicle with the equipped vehicle; nominally positioning the equipped vehicle and target adjustment stand relative to each other with a longitudinal axis of the equipped vehicle intersecting the target adjustment stand, wherein the target adjustment stand includes a base and a target mount configured to support a target, and wherein the target adjustment stand includes actuators for adjusting the position of the target mount; determining an orientation of the equipped vehicle relative to the target adjustment stand using a computer system; positioning the target mount based on the determined orientation of the equipped vehicle relative to a sensor of the equipped vehicle by actuating the actuators with the computer system; and performing a calibration routine whereby the sensor is calibrated using the target.

11. The method of claim 10, wherein the target adjustment stand is moveable between a deployed position and a transport position, and wherein said method further comprises deploying the target adjustment stand from the transport position to the deployed position after said transporting the target adjustment stand to the equipped vehicle using the transport vehicle.

12. The method of claim 10, wherein said determining an orientation of the equipped vehicle relative to the target adjustment stand includes determining a runout-compensated thrust angle of the equipped vehicle, and wherein said positioning the target mount includes positioning the target based on the runout-compensated thrust angle.

13. The method of claim 12, wherein said determining a runout-compensated thrust angle of the equipped vehicle comprises determining wheel alignment at multiple positions of the equipped vehicle, with the tire assemblies of the equipped vehicle rotated between the multiple positions.

14. The method of claim 10, wherein said determining an orientation of the equipped vehicle relative to the target adjustment stand comprises;
projecting lights from light projectors on rearward wheel clamps through apertures on aperture plates of forward wheel clamps, wherein the rearward wheel clamps are mounted to the opposed wheel assemblies on opposite sides of the equipped vehicle furthest from the target adjustment stand and the forward wheel clamps are mounted to the opposed wheel assemblies on opposite sides of the equipped vehicle closest to the target adjustment stand;
imaging light projected through the apertures by the light projectors with imagers disposed at the target adjustment stand; and
determining the orientation of the equipped vehicle relative to the target adjustment stand based on the images of projected light obtained by the imagers.

15. The method of claim 14, wherein said target adjustment stand includes a pair of spaced apart imager panels, and wherein said projecting lights from light projectors comprises projecting light onto respective ones of said imager panels to form a light pattern on each imager panel, and wherein the imagers are configured to image the light patterns.

16. The method of claim 15, wherein the imager panels are translucent, and wherein the light pattern formed on each imager panel is imaged from a back surface of the imager panels.

17. The method of claim 14, wherein a pair of opposed wheel clamps selected from the forward wheel clamps and the rearward wheel clamps each further include a distance sensor configured to obtain distance information relative to spaced apart portions of the target adjustment stand, and wherein said determining an orientation of the equipped vehicle comprises determining the orientation of the equipped vehicle relative to the target adjustment stand based at least in part on the distance information from each distance sensor.

18. The method of claim 10, wherein said computer system comprises a remote computing device, wherein the remote computing device is configured to determine the orientation of the equipped vehicle relative to the target adjustment stand and transmit control signals to selectively actuate the actuators.

19. A mobile system for aligning a target to an equipped vehicle for calibration of a sensor on the equipped vehicle, said system comprising:
a transport vehicle with a target adjustment stand moveably mounted to said transport vehicle, wherein said transport vehicle comprises a motorized vehicle comprising a van or a truck that is configured to be driven over roads to transport said target adjustment stand to an equipped vehicle for calibration of a sensor on the equipped vehicle, and wherein said target adjustment stand is moveable between a deployed position and a transport position, and wherein said target adjustment stand is positioned adjacent the equipped vehicle with a longitudinal axis of the equipped vehicle intersecting the target adjustment stand in said deployed position and is stowed for transport in said transport position;
said target adjustment stand including a base and a target mount moveably mounted on said base with said target mount configured to support a target, said target adjustment stand further including a plurality of actuators configured to selectively move said target mount relative to said base;
a plurality of wheel clamps affixable to wheels of the equipped vehicle, wherein said wheel clamps comprise two rearward wheel clamps and two forward wheel clamps, wherein said rearward wheel clamps each include a light projector and are configured for mounting to the opposed wheel assemblies on opposite sides of the equipped vehicle furthest from said target adjustment stand, and wherein said forward wheel clamps each include an aperture and are configured for mounting to the opposed wheel assemblies on opposite sides of the equipped vehicle closest to said target adjustment stand, wherein said light projectors are configured to selectively project light at respective ones of said apertures through which the projected light is directed at said target adjustment stand;
wherein said target adjustment stand further comprises a pair of imagers with each said imager operable to image projected light passing through respective ones of said apertures; and
a computer system, said computer system configured to selectively actuate said actuators to position said target relative to the equipped vehicle when the equipped vehicle is positioned in front of said target adjustment stand, wherein said computer system is configured to determine the orientation of the equipped vehicle relative to said target adjustment stand based on said images of projected light obtained by said imagers and to actuate said actuators responsive to the determination of the orientation of the equipped vehicle relative to said target adjustment stand to position said target relative to a sensor of the equipped vehicle whereby the sensor is able to be calibrated using the target.

20. The system of claim 19, wherein said target mount is moveable by said actuators longitudinally and laterally with respect to a longitudinal axis of the equipped vehicle when positioned in front of said target adjustment stand, and vertically, and rotationally about a vertical axis.

21. The system of claim 19, wherein said target adjustment stand further includes a pair of spaced apart imager panels, wherein projected light passing through said apertures is projected onto respective ones of said imager panels to form a light pattern on each said imager panel, and wherein said imagers are configured to image said light patterns.

22. The system of claim 19, wherein a pair of opposed wheel clamps selected from said plurality of wheel clamps each further include a distance sensor configured to obtain distance information of said opposed wheel clamps relative to spaced apart portions of said target adjustment stand, and wherein said computer system is operable to determine the orientation of the equipped vehicle relative to said target adjustment stand based at least in part on the distance information from each said distance sensor.

23. The system of claim 19, wherein said computer system comprises a controller, and wherein said controller is configured to selectively actuate said actuators, wherein said computer system further comprises a remote computing device, wherein said remote computing device is configured to determine the orientation of the equipped vehicle relative to said target adjustment stand and transmit control signals to said controller for selectively actuating said actuators.

* * * * *

UNITED STATES PATENT AND TRADEMARK OFFICE
CERTIFICATE OF CORRECTION

| | | |
|---|---|---|
| PATENT NO. | : 11,781,860 B2 | |
| APPLICATION NO. | : 16/728361 | |
| DATED | : October 10, 2023 | |
| INVENTOR(S) | : Jon D. Lawrence et al. | |

It is certified that error appears in the above-identified patent and that said Letters Patent is hereby corrected as shown below:

In the Specification

Column 5:
Line 42 "("IW")" should be --("IR")--

In the Claims

Column 19:
Line 33, Claim 1, "a bout" should be --about--

Signed and Sealed this
Twelfth Day of March, 2024

Katherine Kelly Vidal
*Director of the United States Patent and Trademark Office*